(12) United States Patent
Yoshimatsu

(10) Patent No.: US 8,249,182 B2
(45) Date of Patent: Aug. 21, 2012

(54) DECODING CIRCUIT, DECODING METHOD, ENCODING CIRCUIT, AND ENCODING METHOD

(75) Inventor: Naoki Yoshimatsu, Aichi (JP)

(73) Assignee: Panasonic Corporation, Osaka (JP)

( * ) Notice: Subject to any disclaimer, the term of this patent is extended or adjusted under 35 U.S.C. 154(b) by 787 days.

(21) Appl. No.: 12/438,708

(22) PCT Filed: Feb. 27, 2008

(86) PCT No.: PCT/JP2008/000367
§ 371 (c)(1),
(2), (4) Date: Feb. 24, 2009

(87) PCT Pub. No.: WO2008/120434
PCT Pub. Date: Oct. 9, 2008

(65) Prior Publication Data
US 2010/0246687 A1    Sep. 30, 2010

(30) Foreign Application Priority Data
Mar. 28, 2007   (JP) ................................. 2007-083752

(51) Int. Cl.
*H04L 23/02* (2006.01)

(52) U.S. Cl. ........................................................ 375/265

(58) Field of Classification Search ............ 375/E7.027, 375/E7.03, E7.033, E7.047, E7.054, E7.069–E7.09, 375/E7.145–E7.147, E7.193, E7.23, E7.231, 375/265
See application file for complete search history.

(56) References Cited

U.S. PATENT DOCUMENTS

| | | | | |
|---|---|---|---|---|
| 4,123,797 A | * | 10/1978 | Strauts et al. | 365/118 |
| 4,387,433 A | * | 6/1983 | Cardenia et al. | 250/492.2 |
| 4,706,260 A | * | 11/1987 | Fedele et al. | 375/245 |
| 5,497,153 A | | 3/1996 | Jeong | |
| 5,602,549 A | | 2/1997 | Jeong | |
| 5,654,706 A | | 8/1997 | Jeong | |
| 5,771,242 A | * | 6/1998 | Adams et al. | 714/738 |
| 5,926,574 A | | 7/1999 | Nishikawa et al. | |
| 5,959,672 A | * | 9/1999 | Sasaki | 375/240.23 |

(Continued)

FOREIGN PATENT DOCUMENTS

EP     0 580 454       1/1994

(Continued)

OTHER PUBLICATIONS

Supplementary European Search Report issued Aug. 16, 2011 in European Application No. EP 08 72 0281.

(Continued)

*Primary Examiner* — Ricky Ngo
*Assistant Examiner* — Phuongchau B Nguyen
(74) *Attorney, Agent, or Firm* — Wenderoth, Lind & Ponack, L.L.P.

(57) ABSTRACT

A decoding circuit performs, with a single circuit, decoding in association with various image encoding systems. A pattern storing unit stores scan pattern data for a scan pattern, a control unit writes scan pattern data for supplied encoded data in the pattern storing unit, a pattern readout control unit reads out the scan pattern data stored in the pattern storing unit, a variable length decoding unit restores coefficient data from the supplied encoded data, and an inverse scan processing unit rearranges the restored coefficient data according to the scan pattern data read out from the pattern storing unit.

16 Claims, 12 Drawing Sheets

U.S. PATENT DOCUMENTS

| | | |
|---|---|---|
| 6,100,826 A | 8/2000 | Jeon et al. |
| 6,381,275 B1* | 4/2002 | Fukuhara et al. ........ 375/240.06 |
| 2001/0028346 A1* | 10/2001 | Kudo et al. .................... 345/204 |
| 2003/0222998 A1* | 12/2003 | Yamauchi et al. ............. 348/262 |
| 2003/0235251 A1* | 12/2003 | Hsiun et al. .................... 375/245 |
| 2004/0120403 A1* | 6/2004 | Sugahara ................. 375/240.16 |
| 2004/0184532 A1* | 9/2004 | Juri et al. .................... 375/240.2 |
| 2006/0222247 A1 | 10/2006 | Sherigar et al. |
| 2007/0081730 A1* | 4/2007 | Arakawa et al. .............. 382/232 |
| 2009/0051573 A1 | 2/2009 | Tomita et al. |

FOREIGN PATENT DOCUMENTS

| | | |
|---|---|---|
| EP | 0 869 680 | 10/1998 |
| EP | 1 351 515 | 10/2003 |
| EP | 1 708 509 | 10/2006 |
| EP | 1 724 931 | 11/2006 |
| JP | 2-264584 | 10/1990 |
| JP | 6-125278 | 5/1994 |
| JP | 6-125539 | 5/1994 |
| JP | 8-256266 | 10/1996 |
| JP | 11-46363 | 2/1999 |
| JP | 2000-50263 | 2/2000 |
| JP | 2004-193751 | 7/2004 |
| WO | 2005/088840 | 9/2005 |

OTHER PUBLICATIONS

"Text of ISO/IEC 14496-10:2004 (second edition)", ITU Study Group 16—Video Coding Experts Group—ISO/IEC MPEG & ITU-T VCEG (ISO/IEC JTC1/SC29/WG11 and ITU-T SG16 Q6), No. N6359, Jun. 3, 2004.

SMPTE Technology Committee C24 on Video Compression Technology: "Proposed SMPTE Standard for Television: VC-1 Compressed Video Bitstream Format and Decoding Process", SMPTE Standard for Television, White Plains, NY, US, No. SMPTE 421M, Aug. 23, 2005, pp. 1-XX.

International Search Report issued May 20, 2008 in the International (PCT) Application No. PCT/JP2008/000367.

* cited by examiner

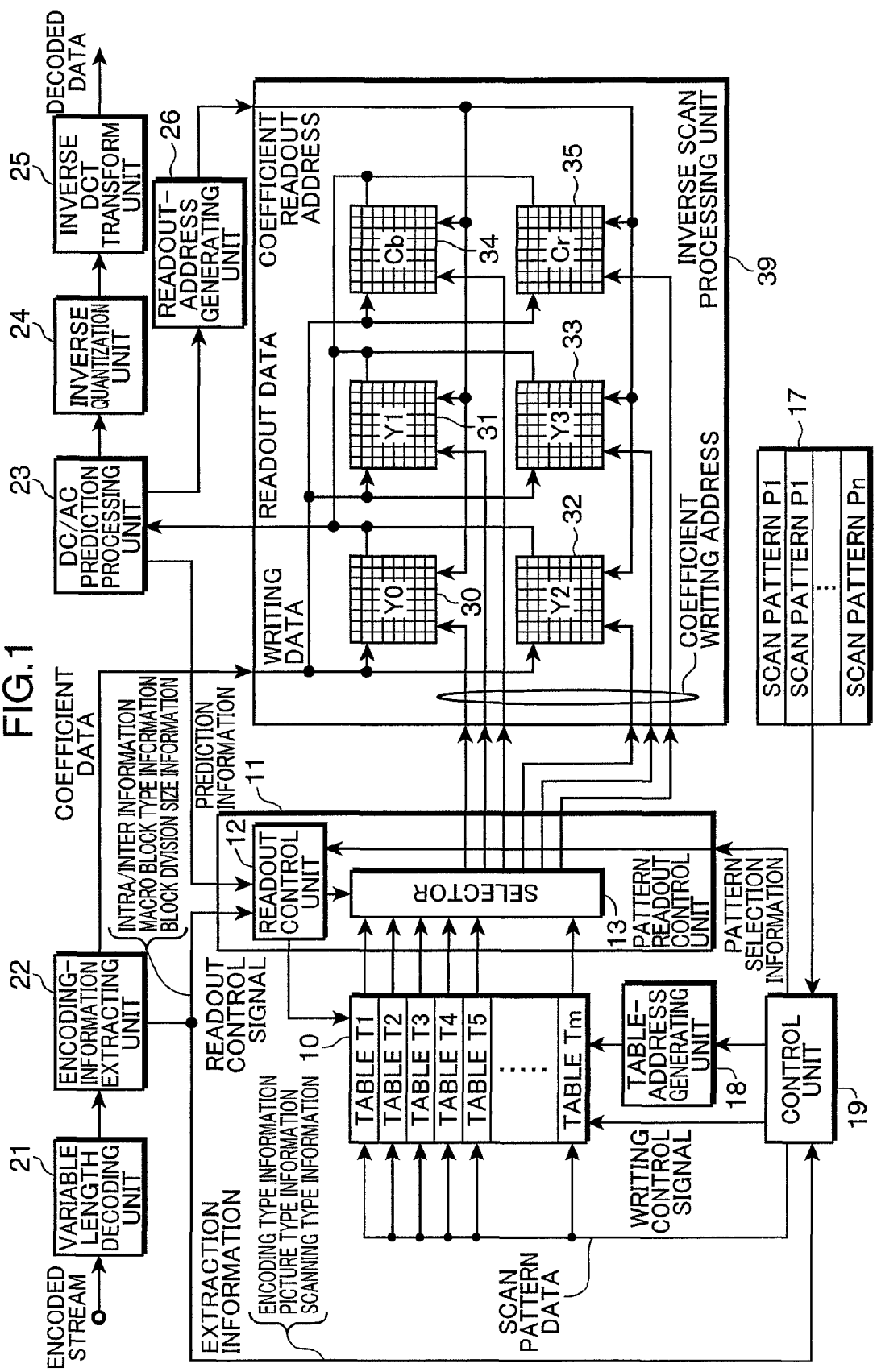

FIG.2

| ENCODING SYSTEM | JPEG | MPEG-1 | MPEG-2 | MPEG-4 | H.264 |
|---|---|---|---|---|---|
| ORTHOGONAL TRANSFORM UNIT | 8×8 | 8×8 | 8×8 | 8×8 | 4×4<br>8×8 |
| SCANNING TYPE | FRAME | FRAME | FRAME<br>FIELD | FRAME<br>FIELD | FRAME<br>FIELD |
| MACRO BLOCK TYPE | INTRA | INTRA<br>NON-INTRA | INTRA<br>NON-INTRA | INTRA | INTRA<br>INTER |
| | | | | INTER | |
| SCAN PATTERN | ZIGZAG SCAN PATTERN | ZIGZAG SCAN PATTERN | ZIGZAG SCAN PATTERN<br>ALTERNATE-VERTICAL SCAN PATTERN | ZIGZAG SCAN PATTERN<br>ALTERNATE-VERTICAL SCAN PATTERN<br>ALTERNATE-HORIZONTAL SCAN PATTERN | ZIGZAG SCAN PATTERN<br>ALTERNATE-VERTICAL SCAN PATTERN |
| | | | | ZIGZAG SCAN PATTERN | |

ZIGZAG SCAN PATTERN

ALTERNATE-VERTICAL SCAN PATTERN

ALTERNATE-HORIZONTAL SCAN PATTERN

SCAN PATTERN OBTAINED BY COMBINING
FOUR ZIGZAG SCAN PATTERNS OF 4 × 4 PIXELS

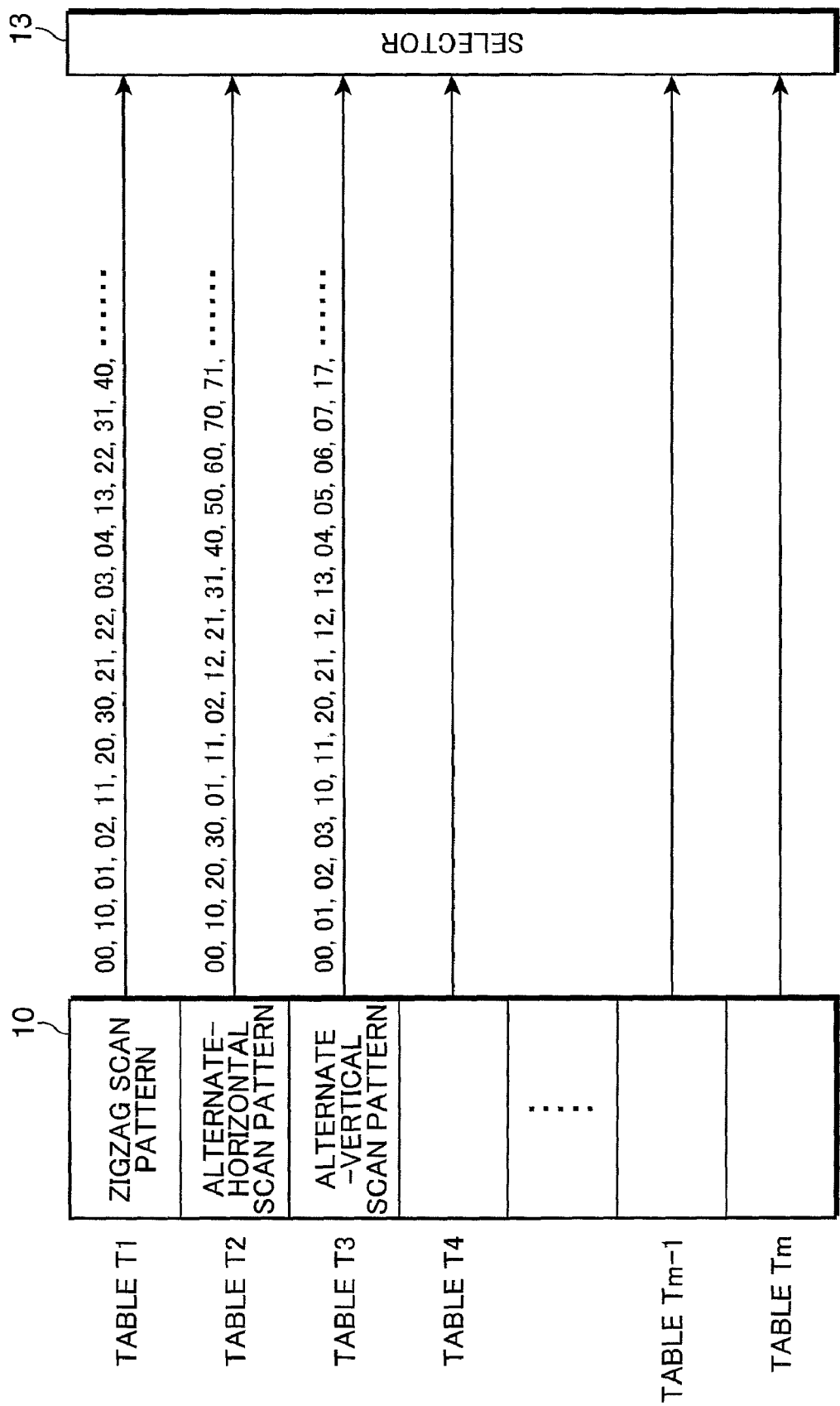

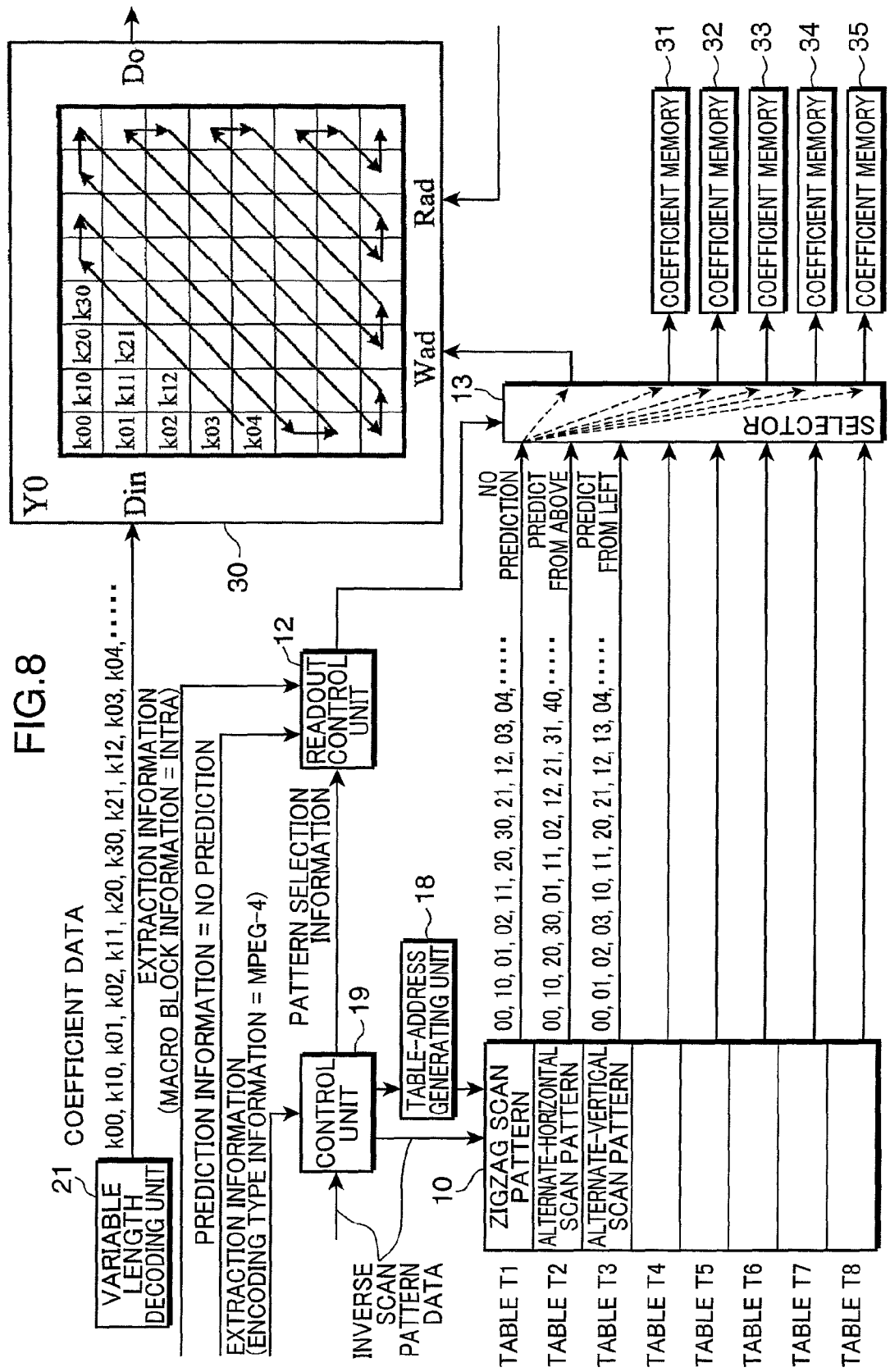

DECODING CIRCUIT, DECODING METHOD, ENCODING CIRCUIT, AND ENCODING METHOD

BACKGROUND OF THE INVENTION

1. Technical Field

The present invention relates to a decoding circuit and a decoding method for decoding encoded data generated by image compression encoding, and, more particularly to a decoding circuit and a decoding method for decoding encoded data generated by image compression encoding for transforming image data into plural coefficient data in units of a block of a predetermined number of pixels and rearranging the transformed plural coefficient data according to a scan pattern indicating order of data.

The present invention also relates to an encoding circuit and an encoding method for generating encoded data with image compression encoding, and, more particularly to an encoding circuit and an encoding method for generating encoded data with image compression encoding for transforming image data into plural coefficient data in units of a block of a predetermined number of pixels and rearranging the transformed plural coefficient data according to a scan pattern indicating order of data.

2. Background Art

In recent years, according to an increase in speed of networks and rapid spread of personal computers and digital television receivers to general homes, various multimedia services are widely put to practical use. In particular, in digital broadcast systems and content delivery systems using the Internet, and the like, it is a general practice to adopt a form of compression-encoding content data such as video and sound on the basis of standards such as the MPEG (Moving Picture Expert Group) system, setting a fraction of encoded data, which is the compression-encoded content data, as a packet, and transmitting a set of packets as a stream signal, or recording the set of packets in a hard disk, a DVD, a memory card, or the like. An information apparatus such as a personal computer, a set-top box, a portable information terminal apparatus, or a cellular phone, which receives such a stream signal, extracts the encoded data included in the stream signal and applies decoding to the extracted encoded data to restore the content data.

As such a system for compression-encoding an image, there is the JPEG (Joint Photographic Experts Group) system for compression-encoding a still image, which is widely used for a digital camera and the like. As a system for compression-encoding a moving image, there is the MPEG-1 system for recording the moving image in a CD-ROM or the like. Consequently, a basic technique such as an image compression encoding method based on, for example, discrete cosine transform is established. On the basis of such a basic technique, for example, the MPEG-2 system used in digital broadcasts, the MPEG-4 system used for contents provided by using the Internet, and the MPEG-4AVC system for the purpose of high compression encoding are used as standard systems in a field of treatment of image signals.

A basic algorithm for such image compression encoding is a hybrid compression encoding system in which the discrete cosine transform system, which is one of orthogonal transform systems, is combined with a motion compensation prediction system. In the hybrid compression encoding system, image compression encoding is applied to an image by combining both data obtained by discrete-cosine-transforming data itself in one picture and data obtained by discrete-cosine-transforming the motion compensation inter-picture prediction data.

In such image compression encoding, the discrete cosine transform is performed in a block unit called macro block. Respective pixel data forming this macro block are transformed into plural coefficient values indicating amplitude intensity for each of frequencies from a direct current component to a high-frequency component by the discrete cosine transform. Such respective coefficient values are first quantized by a method based on each compression encoding system to be transformed into quantized coefficient values. Further, the respective quantized coefficient values are rearranged according to a scan pattern indicating order of the respective data in order to improve a compression ratio by variable length encoding. Thereafter, the rearranged respective quantized coefficient values are sequentially subjected to variable length encoding according to the order of the scan pattern.

As such variable length encoding, run level encoding for allocating a unique code to a set of a run, which is the number of preceding zero quantized coefficient values, and a level, which is a non-zero quantized coefficient value, to realize compression of data is used. Image compression encoding is performed on the basis of such an algorithm and encoded data including the coefficient data compressed as explained above is generated.

An image can be restored by applying decoding in association with the compression encoding to the encoded data generated by the compression encoding (see, for example, Patent Document 1). In other words, the quantized coefficient values conforming to the order of the scan pattern are restored from the data of the run and the level included in the encoded data. Further, the quantized coefficient values are rearranged according to scan pattern data for the scan pattern in the compression encoding. Consequently, the respective quantized coefficient values arranged in predetermined positions on the macro block are restored. Further, inverse quantization is applied to these quantized coefficient values and inverse discrete cosine transform is applied to the respective coefficient value restored by the inverse quantization, whereby pixel data in the macro block unit is restored.

FIG. 12 is a block diagram showing a configuration of a decoding circuit in the past that performs decoding. The decoding circuit in the past shown in FIG. 12 includes a symbol decoding unit 91, an address output unit 92, and a data storing unit 93.

The symbol decoding unit 91 decodes received run-level encoded symbol data and outputs zero of a run and data represented by a level following the zero of the run. The address output unit 92 stores scan addresses on the basis of scan order of each of plural scan patterns and outputs a scan address for a selected scan pattern in synchronization with a clock pulse. The data storing unit 93 stores the data outputted from the symbol decoding unit 91 in a storage position designated by the scan address outputted from the address output unit 92.

With such a configuration, the decoding circuit in the past run-level decodes the run-level encoded symbol data on the basis of the scan pattern used for the run-level encoding and stores the symbol data in a form suitable for use in apparatus at post stages. In this way, the decoding circuit in the past can transform the run-level encoded symbol data into the form suitable for use in apparatuses at post stages and store the symbol data even when various scan patterns are required for the run-level encoding.

However, as in the decoding circuit in the past, when scan addresses associated with plural scan patterns are stored in advance, there is a problem in that, for example, when a new encoding system is proposed, it is difficult to quickly cope with the encoding system and redesign of an LSI (Large Scale Integration) and the like for performing decoding is necessary. Further, as in the decoding circuit in the past, when scan addresses associated with respective scan patterns are stored, there is a problem in that a circuit size increases because, according to an increase in types of the scan patterns, capacities of a memory and the like for storing the scan addresses also increases.

Patent Document 1: Japanese Patent Application Laid-Open No. 11-46363

SUMMARY OF THE INVENTION

The present invention has been devised in order to solve the problems and it is an object of the present invention to provide a decoding circuit, a decoding method, an encoding circuit, and an encoding method that can perform, with a single circuit, decoding in association with various image encoding systems and have universality.

A decoding circuit according to an aspect of the present invention is a decoding circuit that decodes encoded data generated by image compression encoding for transforming image data into plural coefficient data in units of a block of a predetermined number of pixels and rearranging the transformed plural coefficient data according to a scan pattern indicating order of data, the decoding circuit including: a pattern storing unit that stores scan pattern data for the scan pattern; a pattern writing unit that writes the scan pattern data for the encoded data supplied thereto in the pattern storing unit; a pattern readout unit that reads out the scan pattern data stored in the pattern storing unit; a coefficient restoring unit that restores the coefficient data from the supplied encoded data; and an inverse scan processing unit that rearranges, according to the scan pattern data read out from the pattern storing unit, the coefficient data restored by the coefficient restoring unit.

With this configuration, scan pattern data for a scan pattern is stored in the pattern storing unit and the scan pattern data for encoded data supplied thereto is written in the pattern storing unit by the pattern writing unit. The scan pattern data stored in the pattern storing unit is read out by the pattern readout unit and coefficient data is restored from the supplied encoded data by the coefficient restoring unit. Thereafter, the coefficient data restored by the coefficient restoring unit are rearranged by the inverse scan processing unit according to the scan pattern data read out from the pattern storing unit by the pattern readout unit.

According to the present invention, since the scan pattern data for the supplied encoded data is written in the pattern storing unit, it is possible to perform, with a single circuit, decoding in association with various image encoding systems and it is possible to provide a decoding circuit that has universality. Even if an encoding system employing a new scan pattern is proposed, it is possible to store a scan pattern for the new scan pattern in the pattern storing unit, it is possible to quickly cope with an unknown standard to be proposed in future, and redesign of an LSI and the like is unnecessary.

Objects, characteristics, and advantages of the present invention will be made apparent by the following detailed explanation and the accompanying drawings.

BRIEF DESCRIPTION OF THE DRAWINGS

FIG. 1 is a block diagram showing a configuration of a decoding circuit according to a first embodiment of the present invention;

FIG. 2 is a table showing an example of scan patterns specified for respective image encoding systems;

FIG. 7 is a diagram showing example of types of scan patterns set in respective tables of a pattern storing unit and scan patterns outputted from the respective tables;

FIG. 8 is a diagram showing an operation example of the decoding circuit according to the first embodiment of the present invention;

DETAILED DESCRIPTION OF THE INVENTION

Figure 3:
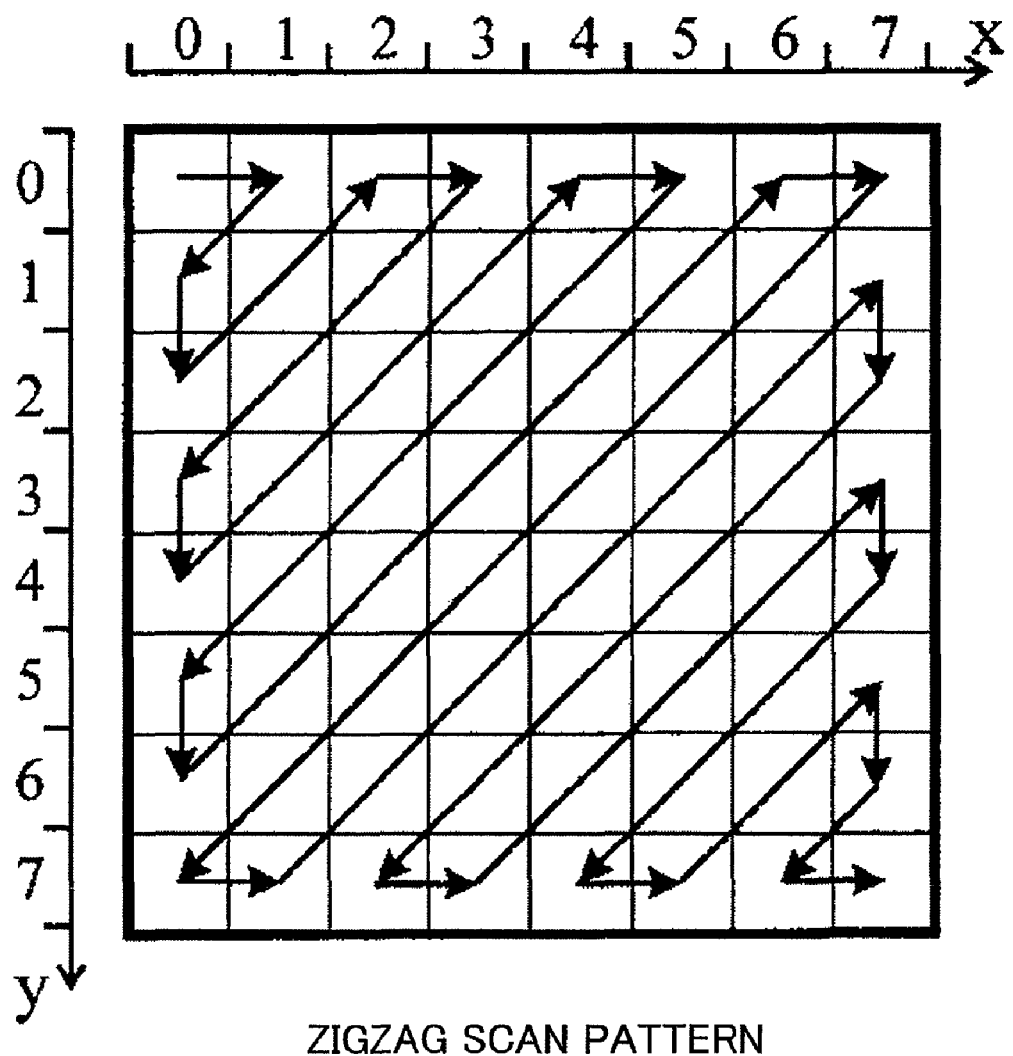
FIG. 3 is a diagram showing a zigzag scan pattern.

Embodiments of the present invention are explained below with reference to the accompanying drawings. The embodiments explained below are examples obtained by embodying the present invention and do not limit, in characteristic thereof, a technical scope of the present invention.

First Embodiment

FIG. 1 is a block diagram showing a configuration of a decoding circuit according to a first embodiment of the present invention. In this embodiment, an example of a decoding circuit that acquires an encoded stream including encoded data generated by compression-encoding image data and restores the original image data from the encoded data is explained.

As shown in FIG. 1, an encoded stream including encoded data is supplied to the decoding circuit. The encoded data supplied to the decoding circuit is generated by image compression encoding. In the compression encoding of the image, image data is discrete cosine transformed in a block unit of a predetermined number of pixels and respective coefficient values for each of blocks generated by the discrete cosine transform are quantized. The respective quantized coefficient values generated by the quantization are rearranged according to a predetermined scan pattern and run-level encoding is applied to the rearranged quantized coefficient values.

The decoding circuit according to this embodiment restores, from run-level encoded data generated by such image compression encoding, coefficient data for quantized coefficient values according to order of a scan pattern. The decoding circuit rearranges the restored coefficient data according to the scan pattern to thereby restore the respective coefficient data arranged in predetermined positions on a block. The decoding circuit applies inverse quantization and inverse discreet cosine transform to the respective coefficient data in the block restored in this way to restore image data of the respective pixels in the block. The decoding circuit outputs the restored image data as decoded data.

In particular, the decoding circuit according to this embodiment is configured to be applicable to the JPEG system for still images and the MPEG-1 system, the MPEG-2 system, the MPEG-4 system, the H.263 system, and the H.264 system also called the MPEG-4AVC system for moving images, and the like standardized by the international standardization organization as encoding systems for images. The decoding circuit according to this embodiment is configured to be applicable to encoding systems independently developed by specific companies and countries as well. Further, in addition to these encoding systems, the decoding circuit according to this embodiment is configured to be applicable to image encoding systems to be proposed in future as well.

In this embodiment, an example in which encoded data encoded by an encoding system employing discrete cosine transform (DCT), which is one kind of orthogonal transform, is decoded is explained. However, this embodiment is applicable to encoding systems employing other kinds of transform that use a method of, for example, calculating a component for each frequency from image data. The decoding circuit may be a decoding circuit that decodes encoded data using transform other than such discrete cosine transform.

The decoding circuit shown in FIG. 1 includes a pattern storing unit 10, a pattern readout control unit 11, a pattern memory 17, a table-address generating unit 18, a control unit 19, a variable length decoding unit 21, an encoding-information extracting unit 22, a DC/AC prediction processing unit 23, an inverse quantization unit 24, an inverse discrete cosine transform unit (hereinafter referred to as inverse DCT transform unit) 25, a readout-address generating unit 26, and an inverse scan processing unit 39.

In FIG. 1, an encoded stream input to the decoding circuit is first supplied to the variable length decoding unit 21. The variable length decoding unit 21 restores a quantized coefficient value, extracted information explained below, and the like from encoded data included in the supplied encoded stream. In other words, in the supplied encoded data, for example, the quantized coefficient value is, in general, formed by run-level encoded data. Therefore, first, the variable length decoding unit 21 restores run data, which is the number of zero quantized coefficient values, and level data, which is a non-zero quantized coefficient value. Next, the variable length decoding unit 21 restores a one-dimensional quantized coefficient row conforming to order of a scan pattern in encoding from the restored run data and level data.

The variable length decoding unit 21 sequentially supplies quantized coefficient values restored in this way to the encoding-information extracting unit 22 as coefficient data. Similarly, the variable length decoding unit 21 restores the extracted information other than the quantized coefficient values as well and supplies the extracted information to the encoding-information extracting unit 22. In this embodiment, the variable length decoding unit 21 functions as a coefficient restoring unit that restores the coefficient data from the encoded data.

Next, the encoding-information extracting unit 22 extracts information concerning the encoded data for performing decoding as extracted information from the data restored by the variable length decoding unit 21. The encoding-information extracting unit 22 extracts, as such extracted information, encoding type information as information concerning a type of encoded data, picture type information, picture scanning type information, macro block type information, block division size information, and the like.

In such extracted information, the encoding type information is information indicating an image encoding system used for generating the encoded data. The picture type information is information indicating which of data generated by intra-picture encoding called I picture, data generated by inter-picture forward prediction encoding called P picture, and data generated by inter-picture bidirectional encoding called B picture presently-supplied encoded data is in, for example, the MPEG-2 system. In the P picture or the B picture, a macro block of intra may be included in the picture. Such information is separately extracted as macro block type information. In the decoding circuit according to this embodiment, such picture type information and macro block type information are used as intra/inter information that is information indicating whether a block being presently processed is intra, which is intra-picture encoding, or inter or non-intra, which is inter-picture encoding.

The picture scanning type information is information indicating whether the encoded data is data generated by a moving image in frame units as sequential scanning or data generated by a moving image in field units as jump scanning. The block division size information is information indicating a block size in performing the discrete cosine transform. Such a block is specified as a macro block of a two-dimensional matrix shape formed by a predetermined number of vertical and horizontal block elements by the respective encoding systems.

For example, in the MPEG-1, MPEG-2, and MPEG-4 systems, four blocks formed by vertical and horizontal 8×8 pixels with respect to luminance image data and two blocks formed by vertical and horizontal 8×8 pixels with respect to color difference image data are specified. A macro block is formed by combining these blocks. The discrete cosine transform is applied to the respective blocks formed by the vertical and horizontal 8×8 pixels. In the H.264 system, the discrete cosine transform is applied to a block formed by vertical and horizontal 8×8 pixels as an expansion system. Further, usually, integer transform obtained by approximating the discrete cosine transform is applied to a block formed by vertical and horizontal 4×4 pixels obtained by further dividing the vertical and horizontal 8×8 pixels. Respective coefficients generated by such discrete cosine transform and the integer transform obtained by approximating the discrete cosine transform are arranged in predetermined positions on the same block sectioned for respective frequencies.

The encoding-information extracting unit 22 notifies the control unit 19 and the pattern readout control unit 11 of the extracted information extracted from the encoded stream. In this embodiment, the encoding-information extracting unit 22 notifies the control unit 19 of the encoding type information, the picture type information, and the picture scanning type information, which are information that appears at a relatively low frequency at a picture level in the extracted information, and notifies the pattern readout control unit 11 of the intra/inter information, the macro block type information, and the block division size information, which are information that appears at a high frequency. The encoding-information extracting unit 22 sequentially supplies the coefficient data restored by the variable length decoding unit 21 to the inverse scan processing unit 39.

The inverse scan processing unit 39 restores coefficient data arranged in predetermined positions on a two-dimensional block by rearranging a one-dimensional coefficient data row conforming to order of a scan pattern in accordance with scan pattern data for the scan pattern. In this embodiment, in order to execute such inverse scan processing, the inverse scan processing unit 39 has four coefficient memories for four luminance block in the macro block and two coefficient memories for two color difference blocks in the macro block.

As shown in FIG. 1, the inverse scan processing unit 39 includes a coefficient memory 30 for a block Y0, a coefficient memory 31 for a block Y1, a coefficient memory 32 for a block Y2, and a coefficient memory 33 for a block Y3, and a coefficient memory 34 for a block Cb and a coefficient memory 35 for a block Cr. The blocks Y0, Y1, Y2, and Y3 are obtained by dividing a luminance block formed by a matrix of vertical and horizontal 16×16 pixels into four. The block Cb and the block Cr are color difference blocks formed by a matrix of vertical and horizontal 8×8 pixels.

The coefficient memories 30, 31, 32, 33, 34, and 35 store, when writing data is supplied and coefficient writing addresses are given thereto, the supplied writing data in the coefficient writing addresses. The coefficient memories 30, 31, 32, 33, 34, and 35 output, when coefficient readout addresses are given thereto, data stored in the coefficient readout addresses as readout data. In other words, by associating addresses of the respective coefficient memories and block element positions, it is possible to store coefficient data in predetermined block element positions and read out the coefficient data in the predetermined block element positions.

In an example cited in this embodiment, in the inverse scan processing unit 39, the six coefficient memories 30, 31, 32, 33, 34, and 35 are provided to correspond to a macro block of an encoding system presently widely used like the MPEG-2 system or the MPEG-4 system. However, only one coefficient memory for block elements of vertical and horizontal 8×8 pixels may be provided and used in a time division manner.

The inverse scan processing unit 39 rearranges, according to the scan pattern, the coefficient data conforming to the order of the scan pattern sequentially supplied from the encoding-information extracting unit 22. Therefore, coefficient writing addresses for the scan pattern for the respective blocks are supplied to the inverse scan processing unit 39 from the pattern readout control unit 11 explained below. The respective coefficient writing addresses are supplied to the coefficient memories 30, 31, 32, 33, 34, and 35 as writing addresses. The coefficient data sequentially supplied from the encoding-information extracting unit 22 are supplied to the coefficient memories 30, 31, 32, 33, 34, and 35 as writing data.

With such a configuration of the inverse scan processing unit 39, the respective coefficient data supplied as the one-dimensional coefficient data row are stored in the writing addresses conforming to the scan pattern in the coefficient memories associated with the respective blocks. The inverse scan processing unit 39 rearranges the respective coefficient data according to such processing and restores the coefficient data arranged in the predetermined addresses on the coefficient memories for the two-dimensional block.

Next, the DC/AC prediction processing unit 23 reads out the coefficient data stored in the coefficient memories 30, 31, 32, 33, 34, and 35 of the inverse scan processing unit 39. The DC/AC prediction processing unit 23 is provided to adapt the decoding circuit to, in particular, the MPEG-4 system, the H.263 system, or the like. For example, in the MPEG-2 system, only direct current components (hereinafter referred to as DC components) of respective blocks in processing in intra are differential encoded. However, in the MPEG-4 system and the H.263 system, both the DC components and alternating current components (hereinafter referred to as AC components) are adaptively prediction encoded, whereby improvement of encoding efficiency of the respective blocks in intra is realized.

Therefore, in the decoding circuit according to this embodiment, when encoded data of a system employing DC/AC prediction like the MPEG-4 system and the H.263 system is supplied, first, the DC/AC prediction processing unit 23 determines a predicting direction with reference to DC components of blocks above and on the left of a block to be processed and calculates a prediction value. Further, the DC/AC prediction processing unit 23 reproduces DC components of the supplied coefficient data and predetermined AC components using the predicting direction and the prediction value and supplies the coefficient data subjected to such DC/AC prediction processing to the inverse quantization unit 24.

When encoded data of an encoding system not employing the DC/AC prediction is supplied, the DC/AC prediction processing unit 23 supplies the coefficient data read out from the inverse scan processing unit 39 to the inverse quantization unit 24 without executing such DC/AC prediction processing. The DC/AC prediction processing unit 23 notifies the pattern readout control unit 11 of the predicting direction determined in this way and presence or absence of prediction as prediction information.

The readout-address generating unit 26 generates readout addresses for reading out the coefficient data stored in the coefficient memories 30, 31, 32, 33, 34, and 35 of the inverse scan processing unit 39. The readout-address generating unit 26 generates coefficient readout addresses in accordance with an instruction of the DC/AC prediction processing unit 23. In order to extract the coefficient data, the DC/AC prediction processing unit 23 instructs the readout-address generating unit 26 to generate coefficient readout addresses. Consequently, the coefficient data stored in the coefficient readout addresses outputted from the readout-address generating unit 26 are supplied from the coefficient memories to the DC/AC prediction processing unit 23.

The inverse quantization unit 24 applies inverse quantization to the respective coefficient data supplied from the DC/AC prediction processing unit 23. Consequently, the coefficient values associated with the block elements of the respective blocks are restored. The inverse quantization unit 24 sequentially supplies the coefficient values restored in this way to the inverse DCT transform unit 25.

The inverse DCT transform unit 25 reads out the coefficient data stored in the coefficient memories 30, 31, 32, 33, 34, and 35 of the inverse scan processing unit 39 and applies, in units of a block, inverse discrete cosine transform to the respective coefficient values generated by the inverse quantization by the inverse quantization unit 24. Consequently, the image data of the respective pixels in the block are restored. In this way, the image data restored by the inverse DCT transform unit 25 are outputted as restored data.

As explained above, in order to adapt the decoding circuit according to this embodiment to the scan patterns in the various encoding systems, the decoding circuit includes the pattern storing unit 10, the pattern readout control unit 11, the pattern memory 17, the table-address generating unit 18, and the control unit 19. The pattern storing unit 10 stores scan pattern data for a scan pattern. The pattern readout control unit 11 performs readout control for reading out the scan pattern data stored in the pattern storing unit 10. The control unit 19 performs writing control for storing the scan pattern data in the pattern storing unit 10 and control of the pattern readout control unit 11.

Further, the table-address generating unit 18 generates addresses indicating respective data storage addresses of the pattern storing unit 10 according to the control by the control unit 19. A collection of scan pattern data to be stored in the respective tables of the pattern storing unit 10 is stored in the pattern memory 17 while being sectioned in accordance with the encoding systems and the types.

Consequently, the control unit 19 reads out scan pattern data indicating a scan pattern for supplied encoded data from the pattern memory 17 and performs writing control to store the readout respective scan pattern data in the pattern storing unit 10. The scan pattern data read out by the control of the pattern readout control unit 11 are supplied to the inverse scan processing unit 39. The inverse scan processing unit 39 rearranges, according to the supplied scan pattern data, the coefficient data restored by the variable length decoding unit 21. In this way, the decoding circuit according to this embodiment executes the decoding according to scan patterns in the various encoding systems.

In order to execute such processing in the decoding circuit according to this embodiment, as shown in FIG. 1, the pattern storing unit 10 includes plural tables that store plural scan pattern data, respectively. In an example shown in FIG. 1, the pattern storing unit 10 includes "m" tables T1 to Tm. The pattern storing unit 10 includes, for example, a readable and rewritable memory such as a RAM. When stored data (scan pattern data) are supplied to the pattern storing unit 10 having such a configuration together with a writing control signal including a writing signal while storage addresses are supplied thereto from the table-address generating unit 18, the stored data are stored in the designated storage addresses. When a readout control signal including a readout signal is given to the pattern storing unit 10 while readout addresses are supplied thereto from the table-address generating unit 18, stored data stored in the designated readout addresses are outputted.

The control unit 19 reads out, according to extracted information notified from the encoding-information extracting unit 22, a collection of scan pattern data for the extracted information from the pattern memory 17 and performs writing control to store the read-out scan pattern data in the pattern storing unit 10. In this way, the control unit 19 functions as a pattern writing unit that writes the scan pattern data in the pattern storing unit 10.

In FIG. 1, the pattern memory 17 stores a collection of scan pattern data associated with encoding systems and types with the scan pattern data sectioned in such a manner as scan patters P1, P2, . . . , and Pn. The control unit 19 extracts the collection of scan pattern data to select, for example, a scan pattern Pn out of the plural scan patterns P1, P2, . . . , and Pn. Further, the control unit 19 sequentially extracts the scan pattern data from the pattern memory 17 and outputs a writing control signal to the pattern storing unit 10 while controlling the table-address generating unit 18 to generate predetermined storage addresses.

In this way, the control unit 19 stores the scan pattern data extracted from the pattern memory 17 in the respective tables of the pattern storing unit 10. Further, the control unit 19 associates, on the basis of the extracted information notified from the encoding-information extracting unit 22, encoded data to be processed and the respective scan pattern data stored in the pattern storing unit 10. The control unit 19 generates, on the basis of the association between the encoded data and the scan pattern data, pattern selection information indicating a scan pattern selection method and the like. Further, the control unit 19 notifies the pattern readout control unit 11 of this pattern selection information. As explained above, the extracted information notified to the control unit 19 is the encoding type information, the picture type information, and the picture scanning type information, which are information that appears at a relatively low frequency. Therefore, the pattern selection information is also low-frequency information.

The pattern readout control unit 11 selects, according to the pattern selection information notified from the control unit 19, the extracted information notified from the encoding-information extracting unit 22, and the prediction information notified from the DC/AC prediction processing unit 23, scan pattern data indicating a scan pattern for the supplied encoded data and performs readout control such that the selected scan pattern data is supplied to the inverse scan processing unit 39. In order to execute such processing, as shown in FIG. 1, the pattern readout control unit 11 includes a readout control unit 12 and a selector 13.

The selector 13 selects scan pattern data outputted from the respective tables of the pattern storing unit 10, associates the tables and the coefficient memories, and supplies the selected scan pattern data to the respective coefficient memories of the inverse scan processing unit 39. The readout control unit 12 performs selection control for the selector 13 together with readout control for scan pattern data to be read out from the pattern storing unit 10. To the readout control unit 12, the pattern selection information is notified from the control unit 19, the extracted information is notified from the encoding-information extracting unit 22, and the prediction information is notified from the DC/AC prediction processing unit 23.

The readout control unit 12 controls, on the basis of pattern selection information set in advance by the control unit 19, the selector 13 to select the scan pattern data stored in the respective tables of the pattern storing unit 10. For example, when an encoding system is the MPEG-4 system, first, the control unit 19 stores a zigzag scan pattern, an alternate-vertical scan pattern, and an alternate-horizontal scan pattern in the pattern storing unit 10. The control unit 19 outputs pattern selection information to the readout control unit 12 to thereby set an operation of the readout control unit 12 to select appropriate scan pattern data according to the intra/inter information and the prediction information.

The pattern selection information includes information for associating the intra/inter information and the prediction information with scan patterns. In other words, it is possible to specify, with the pattern selection information, a scan pattern to be selected when encoded data is intra and a scan pattern to be selected when encoded data is inter.

Consequently, the readout control unit 12 controls, when inter is notified in the intra/inter information, the selector 13 to fixedly select a table of the zigzag scan pattern stored in the pattern storing unit 10. The readout control unit 12 controls, when intra is notified in the intra/inter information, the selector 13 to select a table of a scan pattern for a predicting direction adaptively responding to the prediction information from the DC/AC prediction processing unit 23. The scan pattern data selected by the selector 13 are respectively supplied to the coefficient memories 30, 31, 32, 33, 34, and 35 as coefficient writing addresses.

The decoding circuit according to this embodiment has the configuration explained above. With such a configuration, a decoding circuit that can perform, with a single circuit, decoding according to the scan patterns in the various image encoding systems is realized.

Figure 4:
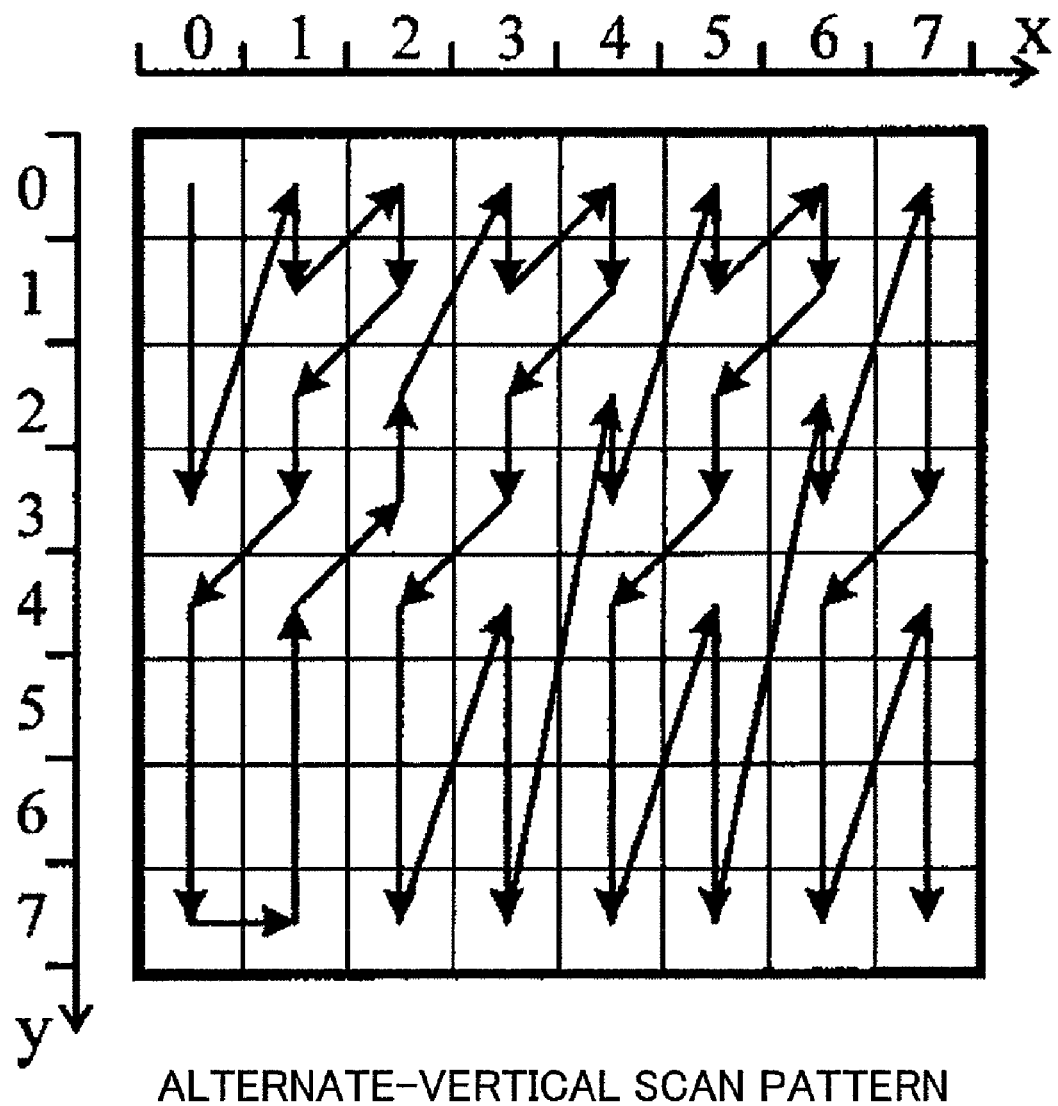
FIG. 4 is a diagram showing an alternate-vertical scan pattern.
Figure 5:
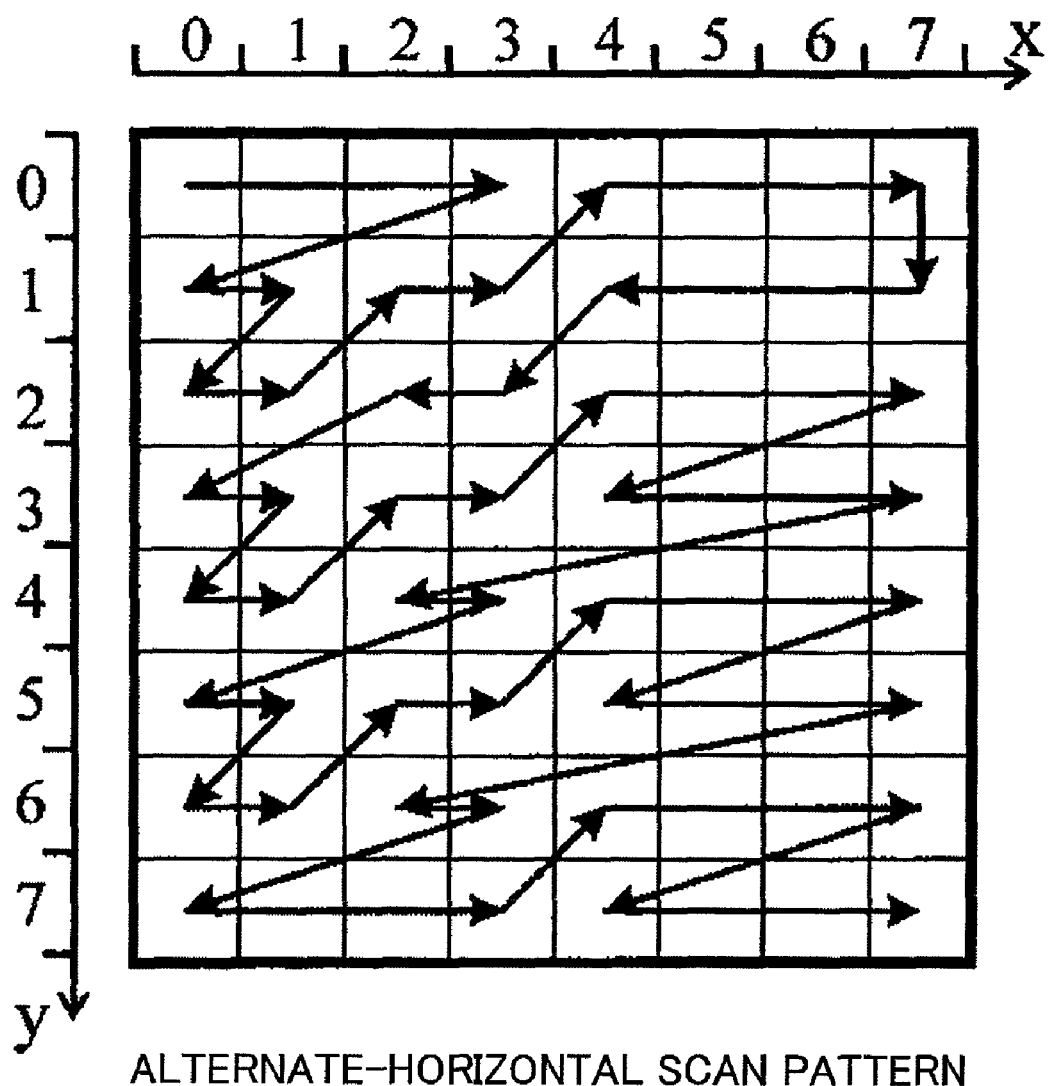
FIG. 5 is a diagram showing an alternate-horizontal scan pattern.

Next, the scan patterns specified in the respective image encoding systems are explained. FIG. 2 is a table showing an example of scan patterns specified for respective image encoding systems. FIGS. 3 to 6 are diagrams showing examples of the scan patterns specified for the respective image encoding systems. FIG. 3 is a diagram showing a zigzag scan pattern, FIG. 4 is a diagram showing an alternate-vertical scan pattern, and FIG. 5 is a diagram showing an alternate-horizontal scan pattern. In FIGS. 3 to 5, respective scan patterns for a block formed by vertical and horizontal 8×8 pixels are shown. Order of the scan patterns is indicated by arrows.

Figure 6:
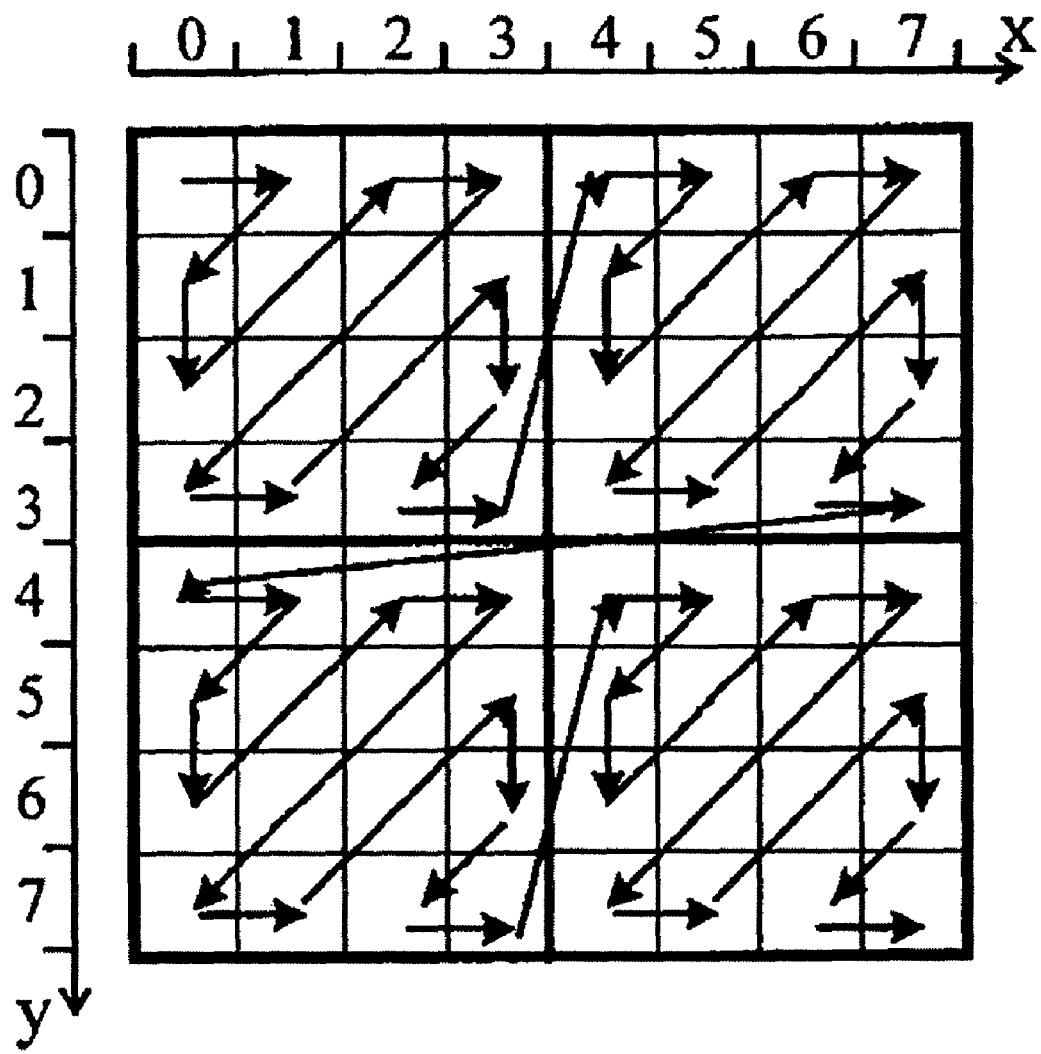
FIG. 6 is a diagram showing an example of a scan pattern associated with a block of vertical and horizontal 4×4 pixels.

FIG. 6 shows an example of scan pattern data for a block of a matrix of vertical and horizontal 8×8 pixels obtained by combining four blocks of vertical and horizontal 4×4 pixels smaller than the block of the matrix of vertical and horizontal 8×8 pixels. By using the scan pattern shown in FIG. 6, it is possible to realize, even for an image encoding system employing the block of vertical and horizontal 4×4 pixels, sharing of a circuit with an image encoding system employing vertical and horizontal 8×8 pixels.

In FIG. 2, scan patterns in the JPEG system widely used as a system for compression-encoding still images, the MPEG-1 system, the MPEG-2 system, and the MPEG-4 system widely used as a system for compression-encoding moving images, and the H.264 system specified by the recommendation of the ITU-T (International Telecommunication Union-Telecommunication Standardization Sector), which is the international standardization organization concerning telecommunication, are shown.

As shown in FIG. 2, in the JPEG system, since still images are targets, the zigzag scan pattern is used regardless of a picture scanning type or a macro block type. The MPEG-1 system is a compression encoding system targeting moving images. However, only the zigzag scan pattern is used regardless of a picture scanning type or a macro block type. In the MPEG-2 system, in addition to the zigzag scan pattern, jump scanning in field units, i.e., the alternate-vertical scan pattern shown in FIG. 4 with high compression efficiency for interlaced moving images is also specified. In the MPEG-2 system, for each of pictures, a scan pattern for a characteristic of an image is selected from such two kinds of scan patterns and compression encoding employing the selected scan pattern is performed.

In the MPEG-4 system, the DC/AC prediction processing is performed as explained above and a scan pattern is changed incidentally to the DC/AC prediction processing. In the MPEG-4 system, specifically, when macro block type in encoding is intra: if prediction of AC components of a target block is invalid, no prediction is assumed and the zigzag scan pattern shown in FIG. 3 is applied; if the AC components of the target block are predicted from a block on the left of the target block, the alternate-vertical scan pattern shown in FIG. 4 is applied; and if the AC components of the target block are predicted from a block above the target block, the alternate-horizontal scan pattern shown in FIG. 5 is applied. In the MPEG-4 system, when a macro block type in encoding is inter, only the zigzag scan pattern is applied. In the JPEG system, the MPEG-1 system, the MPEG-2 system, and the MPEG-4 system, as indicated by orthogonal transform unit in FIG. 2, a block size with vertical and horizontal 8×8 pixels is specified as a block size for performing the discrete cosine transform.

In the H.264 system, vertical and horizontal 8×8 pixels can be applied as an extension system and, usually, the discrete cosine transform is applied to respective blocks formed by vertical and horizontal 4×4 pixels. Any one of the zigzag scan pattern and the alternate-vertical scan pattern is applied to quantized coefficient values arranged on the block formed by vertical and horizontal 4×4 pixels. In the H.264 system, the zigzag scan pattern is applied when a picture scanning type in encoding is a frame and the alternate-vertical scan pattern is applied when the picture scanning type is a field.

In FIG. 2, only the scan patterns of the encoding systems standardized by the international standardization organization are shown. However, for example, in encoding systems independently developed by specific companies and countries, there is a method of using a block shape different from the orthogonal transform unit shown in FIG. 2 and using scan patterns different from the scan patterns shown in FIGS. 3 to 5.

In such encoding systems, for example, when the zigzag scan pattern is used in encoding, coefficient data are rearranged as explained below. When a horizontal direction of the block of vertical and horizontal 8×8 pixels shown in FIGS. 3 to 5 is represented as "x", a vertical direction thereof is represented as "y", and respective element positions of the block are represented as xy (x and y are integers in a range from 0 to 7), a coefficient value for a DC component is arranged in a block element 00 on the upper left for a two-dimensional spatial frequency according to the discrete cosine transform for the vertical and horizontal 8×8 pixels. As "x" of the block element increases, a coefficient value for an AC component with a higher horizontal frequency is arranged. As "y" of the block element increases, a coefficient value for an AC component of a higher vertical frequency is arranged.

In this way, the coefficient values arranged in the respective block elements are quantized and transformed into coefficient data respectively indicating quantized coefficient values. When coefficient data arranged in the block elements xy are represented as kxy, such respective coefficient data are rearranged into a one-dimensional coefficient data row in order of k00, k10, k01, k02, k11, k20, . . . according to a predetermined scan pattern, i.e., in this case, the zigzag scan pattern shown in FIG. 3. The respective coefficient data rearranged in this way are run-level encoded and encoded data are generated.

On the other hand, the decoding circuit according to this embodiment restores, for the encoded data generated by such image compression encoding, first, coefficient data conforming to order of a scan pattern from the run-level encoded data. For example, when the encoded data encoded by using the zigzag scan pattern is supplied to the decoding circuit, the coefficient data restored by the variable length decoding unit 21 is one-dimensional coefficient data row in order of k00, k10, k01, k02, k11, k20, . . . conforming to the zigzag scan pattern. In order to arrange the respective coefficient data in such order in predetermined block element positions, respectively, the decoding circuit uses the scan pattern data stored in the pattern storing unit 10.

In other words, with respect to the coefficient data k00, k10, k01, k02, k11, k20, . . . in the order conforming to the zigzag scan pattern restored by the variable length decoding unit 21 and supplied from the encoding-information extracting unit 22, scan pattern data with a data row 00, 10, 01, 02, 11, 20, . . . for the block element positions of the coefficient data are outputted from a table for the zigzag scan pattern stored in the pattern storing unit 10. Such scan pattern data are supplied to the coefficient memories of the inverse scan processing unit 39 as coefficient writing addresses in synchronization with the supplied coefficient data.

Consequently, for example, when coefficient data in order conforming to the zigzag scan pattern are supplied to a target coefficient memory for writing of the inverse scan processing unit 39, the coefficient writing address 00 is supplied when the coefficient data k00 is supplied. The coefficient data k00 is stored in a position for the block element 00 of the coefficient memory. Similarly, the respective coefficient data are sequentially stored in the coefficient memory in such a manner that the coefficient data k10 is stored in the block element 10 of the coefficient memory, the coefficient data k01 is stored in the block element 01, the coefficient data k02 is stored in the block element 02, the coefficient data k11 is stored in the block element 11, and the coefficient data k20 is store in the block element 20. The decoding circuit according to this embodiment restores the respective coefficient data two-dimensionally arranged in the predetermined positions on the block according to the rearrangement of the one-dimensional coefficient data row performed by using such scan pattern data.

In this embodiment, to comply with the standard of compression encoding and simplify explanation, the coefficient data are arranged in the two-dimensionally arranged coefficient memories 30, 31, 32, 33, 34, and 35. However, for example, the coefficient data may be stored in a one-dimensional storage area in which addresses continue. In other words, it is sufficient that rearrangement according to a scan pattern is performed in a state in which block element positions and addresses for storing coefficient data in the coefficient memories are associated and, in the processing of the inverse discrete cosine transform in the inverse DCT transform unit 25, the processing can be performed in a state in which the block element positions and addresses in which data are stored in the coefficient memories are associated.

For example, it is sufficient that the block element positions and the coefficient memory addresses are associated to set the block elements 00 to 07 as addresses 0 to 7 and set the block elements 10 to 17 as addresses 8 to 15 and data in the address 8 is extracted when data of the block element 10 is necessary.

The coefficient memories 30, 31, 32, 33, 34, and 35 may be configured by, for example, an integrated memory and used with a storage area thereof divided according to the respective blocks. Further, as explained above, for example, only one coefficient memory with block elements of vertical and horizontal 8×8 pixels may be provided and used in a time division manner.

FIG. 7 is a diagram showing example of types of scan patterns set in the respective tables of the pattern storing unit 10 and scan patterns outputted from the respective tables. In FIG. 7, for example, the zigzag scan pattern is set in a table T1. Scan pattern data represented by a data row 00, 10, 01, 02, 11, 20, . . . , and 77 are outputted from the table T1 according to the order indicated by the arrow in FIG. 3. The alternate-horizontal scan pattern is set in a table T2. Scan pattern data represented by a data row 00, 10, 20, 30, 01, 11, . . . , and 77 are outputted from the table T2 according to the order indicated by the arrow in FIG. 5. The alternate-vertical scan pattern is set in a table T3. Scan pattern data represented by a data row 00, 01, 02, 03, 10, 11, . . . , and 77 are outputted from the table T3 according to the order indicated by the arrow in FIG. 4.

Detailed operations of the decoding circuit configured in this way are explained below.

FIG. 8 is a diagram showing an operation example of the decoding circuit according to the first embodiment of the present invention. In the operation example shown in FIG. 8, coefficient data restored by the variable length decoding unit 21 and outputted from the encoding-information extracting unit 22 are stored in addresses associated with the block elements of the coefficient memories of the inverse scan processing unit 39 according to the scan pattern data store in the pattern storing unit 10. In FIG. 8, an operation in storing coefficient data in the coefficient memory 30 of the inverse scan processing unit 39 is representatively shown by citing an example in which decoding is applied to encoded data encoded by the MPEG-4 system. An operation example of such decoding applied to encoded data encoded on the basis of the MPEG-4 system is explained below.

First, when an encoded stream is supplied to the decoding circuit, the variable length decoding unit 21 restores encoded data included in the encoded stream. The encoding-information extracting unit 22 extracts, from system data or the like, information concerning the encoded data for performing decoding as extracted information. In the case of this operation example, first, the encoding-information extracting unit 22 detects that the supplied encoded data is encoded data generated on the basis of the MPEG-4 system and notifies the control unit 19 of encoding type information indicating that an encoding type is the MPEG-4 system.

The control unit 19 extracts, according to the encoding type information from the encoding-information extracting unit 22, a collection of scan pattern data in accordance with the MPEG-4 system from various scan pattern data stored in the pattern memory 17 in advance. Further, the control unit 19 controls the table-address generating unit 18 to output a predetermined address and outputs a writing control signal to the pattern storing unit 10 while sequentially extracting the scan pattern data in accordance with the MPEG-4 system. Consequently, the control unit 19 stores the extracted scan pattern data in the respective tables of the pattern storing unit 10.

In FIG. 8, an example of the scan pattern data stored in the pattern storing unit 10 in this way is shown. As shown in FIG. 2, in the case of the MPEG-4 system, when a macro block type is intra, the zigzag scan pattern, the alternate-vertical scan pattern, and the alternate-horizontal scan pattern are adaptively switched as a scan pattern according to DC/AC prediction. Therefore, as illustrated in FIG. 8, in order to associate scan patterns for the DC/AC prediction with respective blocks, the control unit 19 stores scan pattern data for the zigzag scan pattern in the table T1, stores scan pattern data for the alternate-horizontal scan pattern in the table T2, and stores scan pattern data for the alternate-vertical scan pattern in the table T3.

At this point, the control unit 19 sets, using pattern selection information, an operation of the readout control unit 12 such that the readout control unit 12 operates in association with the setting of the scan patterns. For example, the control unit 19 sets an operation of the readout control unit 12 using the pattern selection information that when inter is notified to the readout control unit 12 as macro block type information, the table T1 storing the scan pattern data for the zigzag scan pattern is selected.

Similarly, the control unit 19 sets an operation of the readout control unit 12 using the pattern selection information that when intra is notified to the readout control unit 12 as macro block type information, the scan pattern data of the tables T1 to T3 storing the zigzag pattern, the alternate-horizontal scan pattern, and the alternate-vertical scan pattern is adaptively selected according to the DC/AC prediction. The control unit 19 sets an operation of the readout control unit 12 using the pattern selection information to select the table T1 when it is notified in prediction information that there is no prediction. The control unit 19 sets an operation of the readout control unit 12 using the pattern selection information to select the table T2 when it is notified that a predicting direction is from above. Further, the control unit 19 sets an operation of the readout control unit 12 using the pattern selection information to select the table T3 when it is notified that the predicting direction is from the left.

On the other hand, the readout control unit 12 controls, according to the operation set by the control unit 19 using the pattern selection information, the selector 13 to appropriately select the scan pattern data in accordance with the MPEG-4 stored in the respective tables of the pattern storing unit 10 according to the prediction information from the DC/AC prediction processing unit 23 and the extracted information from the encoding-information extracting unit 22.

First, the readout control unit 12 judges, on the basis of intra/inter information included in the extracted information from the encoding-information extracting unit 22, whether supplied encoded data is intra or inter. When the supplied encoded data is inter, the readout control unit 12 controls the selector 13 to select the table T1. Consequently, for example, when the block Y0 is inter, the scan pattern data for the zigzag scan pattern data stored in the table T1 is supplied to the coefficient memory 30 for the block Y0.

On the other hand, when the supplied encoded data is intra, the readout control unit 12 controls the selector 13 on the basis of the prediction information notified from the DC/AC prediction processing unit 23. The readout control unit 12 controls the selector 13 to select the table T1 when it is notified in the prediction information that there is no prediction, controls the selector 13 to select the table T2 when it is notified that the predicting direction is from above, and controls the selector 13 to select the table T3 when it is notified that the predicting direction is from the left.

Consequently, for example, with respect to the coefficient memory 30 for the block Y0, when there is no prediction in the DC/AC prediction, the scan pattern data for the zigzag scan pattern stored in the table T1 is supplied. When the predicting direction is from above, the scan pattern data for the alternate-horizontal scan pattern stored in the table T2 is supplied. When the predicting direction is from the left, the scan pattern data for the alternate-vertical scan pattern stored in the table T3 is supplied. In this way, the coefficient data are stored in the respective coefficient memories according to the DC/AC prediction in the encoding.

As more specific operation example, the scan pattern data selected by the selector 13 is supplied to a writing address terminal Wad of the coefficient memory 30 as a coefficient writing address as shown in FIG. 8. The coefficient data restored by the variable length decoding unit 21 is supplied to a data input terminal Din of the coefficient memory 30.

For example, as shown in FIG. 8, the readout control unit 12 supplies, in synchronization with the coefficient data k00, k10, k01, k02, k11, k20, . . . being sequentially supplied to the data input terminal Din from the encoding-information extracting unit 22 in order conforming to the zigzag scan pattern, a scan pattern data row 00, 10, 01, 02, 11, 20, . . . for the zigzag scan pattern selected by the selector 13 to the writing address terminal Wad. Consequently, it is possible to restore respective coefficient data two-dimensionally arranged in predetermined positions on the block Y0 as illustrated in FIG. 8.

When a coefficient readout address is inputted to a readout address terminal Rad of the coefficient memory 30, data stored in the coefficient readout address is outputted from a data output terminal Do as readout data. In this way, it is possible to store coefficient data in predetermined block element positions, read out the coefficient data in the predetermined block element position, and perform execution of the discrete cosine transform and the like for the restored coefficient data.

The operation example in the case of the MPEG-4 system is explained above. However, for example, when encoded data of the JPEG system or the MPEG-1 system is supplied, it is sufficient to store scan pattern data for the zigzag scan pattern in the pattern storing unit 10 and set the selector 13 to supply the scan pattern data to the coefficient memories 30, 31, 32, 33, 34, and 35.

When encoded data of the MPEG-2 system is supplied, the control unit 19 stores scan pattern data for the zigzag scan pattern and the alternate-vertical scan pattern in the pattern storing unit 10. Further, the control unit 19 sets operations of the readout control unit 12 in association with scan patterns for respective pictures. The readout control unit 12 controls the selector 13 according to pattern selection information representing which of the zigzag scan pattern and the alternate-vertical scan pattern a scan pattern is. In other words, the readout control unit 12 selects scan pattern data of any one of the zigzag scan pattern and the alternate-vertical scan pattern according to pattern selection information determined for the respective pictures. The selected scan pattern data is supplied from the selector 13 to the coefficient memories 30, 31, 32, 33, 34, and 35.

When encoded data of the H.264 system is supplied, the control unit 19 stores, in the pattern storing unit 10, scan pattern data for the zigzag scan pattern of the block of vertical and horizontal 4×4 pixels, the alternate-vertical scan pattern for the block of vertical and horizontal 4×4 pixels, the zigzag scan pattern for the block of vertical and horizontal 8×8 pixels, and the alternate-vertical scan pattern for the block of vertical and horizontal 8×8 pixels. Further, the control unit 19 sets operations of the readout control unit 12 in association with scan patterns for respective block division sizes and scan types. The readout control unit 12 controls the selector 13 according to pattern selection information. The readout control unit 12 judges block division size information and picture scanning type information and selects, according to the judged block division size information and picture scanning type information, any one of the plural scan pattern data stored in the pattern storing unit 10. The selected scan pattern data is supplied from the selector 13 to the coefficient memories 30, 31, 32, 33, 34, and 35.

In order to operate for a scan pattern with the block of vertical and horizontal 4×4 pixels, the pattern storing unit 10 may store scan pattern data for the zigzag scan pattern for the block of the vertical and horizontal 8×8 pixels obtained by combining four blocks of vertical and horizontal 4×4 pixels shown in FIG. 6 and the alternate-vertical scan pattern for the block of vertical and horizontal 8×8 pixels obtained by combining four blocks of vertical and horizontal 4×4 pixels. Further, in order to operate for a scan pattern with the block of vertical and horizontal 8×8 pixels, the pattern storing unit 10 may store scan pattern data for the zigzag scan pattern for the block of vertical and horizontal 8×8 pixels and the alternate-vertical scan pattern for the block of vertical and horizontal 8×8 pixels.

When encoded data of an encoding system independently developed by a specific company or country is supplied, the control unit 19 only has to store scan pattern data specified by the encoding system in the pattern storing unit 10. The pattern readout control unit 11 only has to supply, on the basis of the rules by the encoding system, the coefficient data to the coefficient memories 30, 31, 32, 33, 34, and 35 according to an appropriate scan pattern.

Figure 9A:
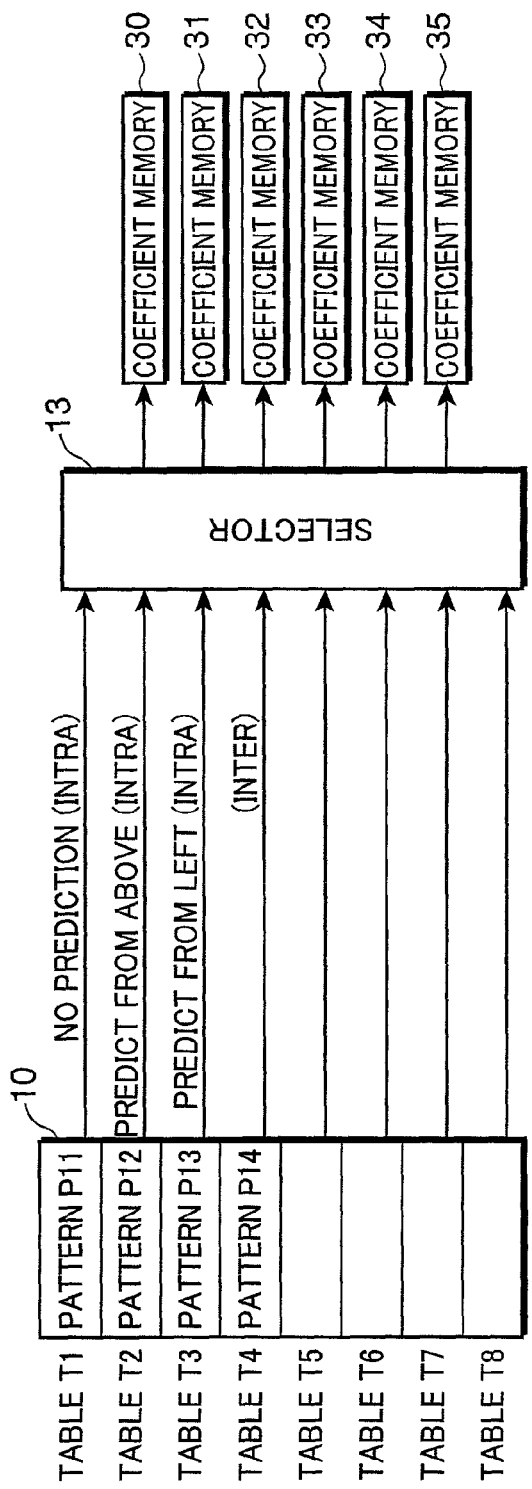
FIG. 9 is a diagram for explaining scan pattern data selected when the decoding circuit according to the first embodiment of the present invention is associated with an encoding system independently developed by a specific company or country.
Figure 9B:
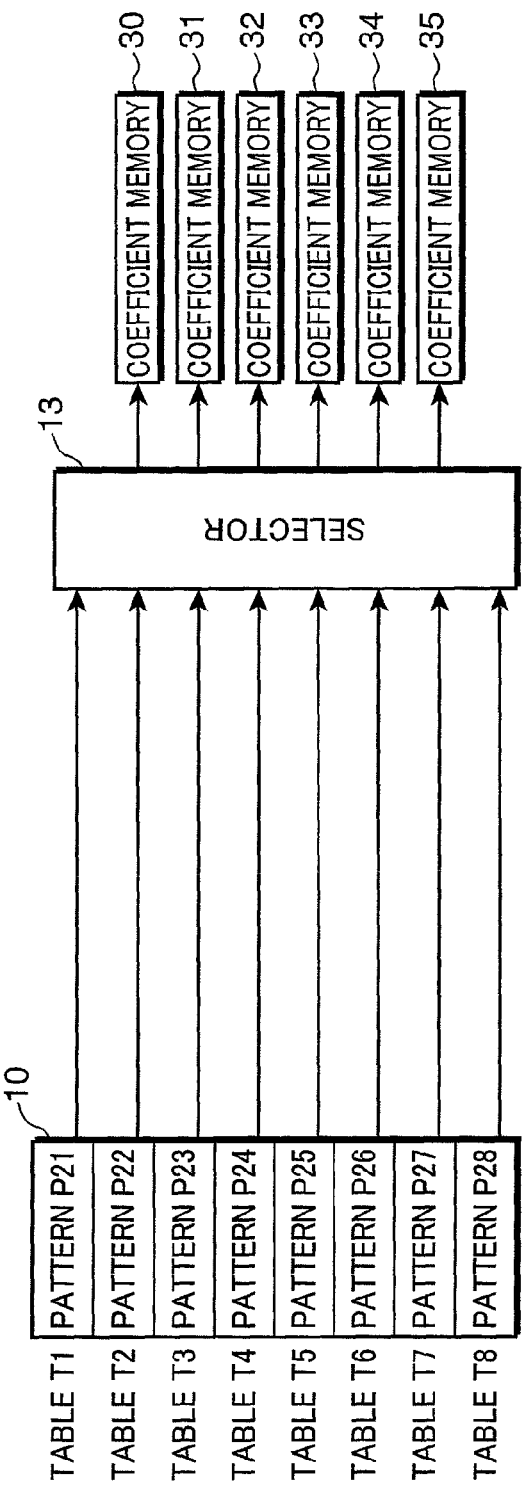

FIG. 9A and FIG. 9B are diagrams for explaining scan pattern data selected when the decoding circuit according to the first embodiment of the present invention is adapted to the encoding system independently developed by the specific company or country. In an example shown in FIG. 9A and FIG. 9B, different scan patterns are used depending on a picture type, a picture scanning type, and the like. The decoding circuit is adapted to an encoding system in which a scan pattern is changed according to prediction such as the DC/AC prediction as well. According to a change of type information (extraxted information) that appears at a low frequency, the control unit 19 controls the respective scan pattern data in the pattern storing unit 10 to be rewritten.

FIG. 9A is a diagram for explaining a scan pattern selected when encoded data, a picture type of which is the I picture, or encoded data, a picture scanning type of which is the frame, is decoded. FIG. 9B is a diagram for explaining a scan pattern selected when encoded data, a picture type of which is the P or B picture, or encoded data, a picture scanning type of which is the field, is decoded. A type of the encoded data used in the decoding circuit shown in FIG. 9A is represented as a first type and a type of the encoded data used in the decoding circuit shown in FIG. 9B is represented as a second type. In this way, the control unit 19 rewrites the respective scan pattern data in the pattern storing unit 10 according to the picture type information or the picture scanning type information. The rewritten respective scan pattern data are adaptively selected by the selector 13.

As shown in FIG. 9A, when supplied encoded data is the first type, scan patterns P11, P12, and P13 for intra and a scan pattern P14 for inter are selectively used for respective blocks. As shown in FIG. 9B, when supplied encoded data is the second type, any one of scan patterns P21 to P28 are selectively use for the respective blocks. FIG. 9A and FIG. 9B show examples at the time when the decoding circuit according to the present invention is adapted to such an encoding system.

In this way, in order to adapt the decoding circuit according to this embodiment to the encoding system independently developed by the specific company or country, in the decoding circuit, the control unit 19 reads out, from the pattern memory 17, scan pattern data for the picture type information or the picture scanning type information included in the extracted information from the encoding-information extracting unit 22 and stores the read-out scan pattern data in the pattern storing unit 10. For example, when encoded data is the first type shown in FIG. 9A, the control unit 19 stores the scan pattern P11 in the table T1, stores the scan pattern P12 in the table T2, stores the scan pattern P13 in the table T3, and stores the scan pattern P14 in the table T4. For example, when encoded data is the second type shown in FIG. 9B, the control unit 19 stores the scan patterns P21, P22 P23, . . . and P28 in the tables T1, T2, T3, . . . and T8, respectively.

The readout control unit 12 controls the selector 13 according to the pattern selection information based on the extracted information notified from the control unit 19, the extracted information notified from the encoding-information extracting unit 22, and the prediction information notified from the DC/AC prediction processing unit 23. The readout control unit 12 controls the selector 13 to select the table T1 when the notified pattern selection information is intra and the notified prediction information indicates that there is no prediction. The readout control unit 12 controls the selector 13 to select the table T2 when it is notified in the prediction information that the predicting direction is from above and select the table T3 when it is notified in the prediction information that the predicting direction is from the left. Further, the readout control unit 12 controls the selector 13 to select the table T4 when the pattern selection information is inter.

In this way, the decoding circuit according to this embodiment can set a scan pattern in the pattern storing unit 10 as appropriate according to the control by the control unit 19 and can adaptively select, according to the control by the readout control unit 12, a scan pattern stored in the pattern storing unit 10 as appropriate and supply the scan pattern to the coefficient memories 30 to 35. Therefore, the decoding circuit according to this embodiment can be adapted to such an encoding system independently developed by the specific company or country as well.

As explained above, the decoding circuit according to the first embodiment of the present invention includes a pattern storing unit that stores scan pattern data for a scan pattern, the control unit 19 that writes the scan pattern data in the pattern storing unit 10, a pattern readout control unit 11 that reads out the scan pattern data stored in the pattern storing unit 10, the variable length decoding unit 21 that restores coefficient data from supplied encoded data, and the inverse scan processing unit 39 that rearranges, according to the scan pattern data read out from the pattern storing unit 10 by the pattern readout control unit 11, the coefficient data restored by the variable length decoding unit 21. The control unit 19 writes scan pattern data indicating a scan pattern for the supplied encoded data in the pattern storing unit 10.

Therefore, for example, even if an encoding system employing a new scan pattern is proposed, it is possible to store a scan pattern for the new scan pattern in the pattern storing unit 10 without increasing a capacity of the pattern storing unit 10. As a result, it is possible to provide a decoding circuit having universality that can be adapted to, with a single circuit, various image encoding systems.

In the above explanation, the present invention is explained by citing the example of the embodiment for decoding encoded data with the decoding circuit including the functional blocks shown in FIG. 1. However, for example, the present invention may be a decoding method including a pattern writing step of writing scan pattern data indicating a scan pattern for supplied encoded data in the pattern storing unit 10, a pattern readout step of reading out the scan pattern data stored in the pattern storing unit 10, a coefficient restoring step of restoring coefficient data from the supplied encoded data, and an inverse scan processing step of rearranging the restored coefficient data according to the scan pattern data read out from the pattern storing unit 10. Specifically, if a program for executing the respective processing steps of such a decoding method is stored in a memory or the like, for example, a CPU such as a microprocessor may sequentially read the program stored in the memory and execute processing according to the read program.

Second Embodiment

Figure 10:
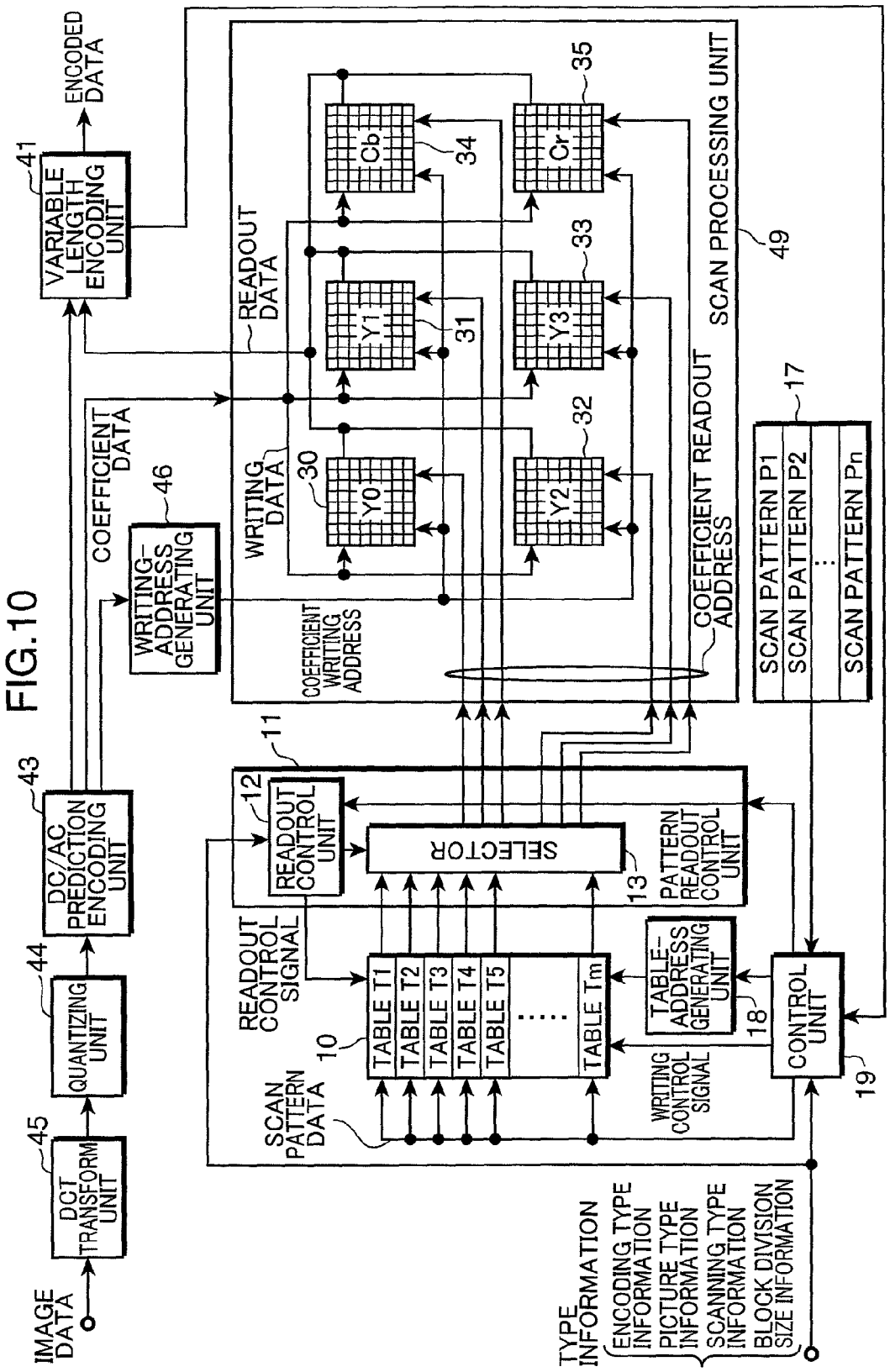
FIG. 10 is a block diagram showing a configuration of an encoding circuit according to a second embodiment of the present invention.

FIG. 10 is a block diagram showing a configuration of an encoding circuit according to a second embodiment of the present invention. This embodiment is explained by citing an example of an encoding circuit that generates encoded data by compression-encoding supplied image data. In FIG. 10, components denoted by reference numerals same as those shown in FIG. 1 have functions same as those shown in FIG. 1 and explanation of the components is omitted.

The encoding circuit according to this embodiment realizes an encoding circuit that is adapted to the JPEG system, the MPEG-1 system, the MPEG-2 system, the MPEG-4 system, the H.263 system, the H.264 system, and the like standardized as image encoding systems and realizes an encoding circuit that is applicable to encoding systems independently developed by specific companies and countries. Further, in addition to these encoding systems, the encoding circuit according to this embodiment is configured to be applicable to encoding systems to be proposed in future as well.

In this embodiment, an example in which image data is encoded by an encoding system employing discrete cosine transform, which is one of orthogonal transform, is explained. However, this embodiment is applicable to encoding systems employing other kinds of transform that use a method of calculating a component for each frequency from image data.

The encoding circuit may be an encoding circuit employing transform other than such discrete cosine transform.

As shown in FIG. 10, image data is supplied to the encoding circuit according to this embodiment. The encoding circuit according to this embodiment applies discrete cosine transform to the supplied image data in units of a block and quantizes respective coefficient values for each of blocks generated by the discrete cosine transform. The encoding circuit rearranges, according to a predetermined scan pattern, the respective quantized coefficient values generated by the quantization as coefficient data. The encoding circuit run-level encoding the rearranged coefficient data and outputs the run-level encoded data as encoded data.

The encoding circuit shown in FIG. 10 includes the pattern storing unit 10, the pattern readout control unit 11, the pattern memory 17, the table-address generating unit 18, the control unit 19, a variable length encoding unit 41, a DC/AC prediction encoding unit 43, a quantizing unit 44, a DCT transform unit 45, a writing-address generating unit 46, and a scan processing unit 49.

In FIG. 10, first, image data inputted to the encoding circuit is supplied to the DCT transform unit 45. The DCT transform unit 45 applies discrete cosine transform to the supplied image data, for example, in units of a block of vertical and horizontal 8×8 pixels to generate respective coefficient values that are sectioned for respective frequencies for predetermined block elements on blocks and correspond to sectioned respective frequency components.

The quantizing unit 44 applies quantization to the respective coefficient values supplied from the DCT transform unit 45. Consequently, coefficient data associated with block elements of respective blocks are generated. The quantizing unit 44 sequentially supplies the coefficient data generated in this way to the DC/AC prediction encoding unit 43.

The DC/AC prediction encoding unit 43 adaptively applies prediction encoding to both DC components and AC components of the coefficient data supplied from the quantizing unit 44. When the DC/AC prediction encoding unit 43 performs encoding on the basis of the MPEG-4 system or the H.263 system, the DC/AC prediction encoding unit 43 performs prediction encoding for both the DC components and the AC components and outputs the coefficient data subjected to the prediction encoding. For an encoding system not employing DC/AC prediction, the DC/AC prediction encoding unit 43 outputs the coefficient data without performing the prediction encoding.

Further, in order to store the outputted encoded data in coefficient memories included in the scan processing unit 49, the DC/AC prediction encoding unit 43 controls the writing-address generating unit 46. The DC/AC prediction encoding unit 43 notifies the variable length encoding unit 41 of information concerning prediction. A coefficient generating unit that generates coefficient data from image data is configured by the DCT transform unit 45, the quantizing unit 44, and the DC/AC prediction encoding unit 43.

Next, the writing-address generating unit 46 generates, according to the control by the DC/AC prediction encoding unit 43, an address for writing data in a predetermined address of the coefficient memories included in the scan processing unit 49.

The coefficient data outputted from the DC/AC prediction encoding unit 43 are supplied to the scan processing unit 49. The scan processing unit 49 rearranges, according to a scan pattern, the respective coefficient data in units of a block generated by the DCT transform unit 45 to thereby generate a one-dimensional coefficient data row. In this embodiment, In order to execute such processing, the scan processing unit 49 has the four coefficient memories 30, 31, 32, and 33 for the four luminance blocks Y0 to Y3 and the two coefficient memories 34 and 35 for the two color difference blocks Cb and Cr in a macro block.

First, the coefficient data from the DC/AC prediction encoding unit 43 are supplied to the respective coefficient memories 30 to 35. At the same time, addresses for sequentially writing the respective coefficient data in predetermined addresses of the respective coefficient memories 30 to 35 are supplied from the writing-address generating unit 46 to the respective coefficient memories 30 to 35. Consequently, coefficient data for respective block elements on the blocks, i.e., respective frequency components are supplied to predetermined coefficient memories.

On the other hand, the scan processing unit 49 sequentially captures the coefficient data from the respective coefficient memories according to order of the scan pattern and rearranges the coefficient data into a one-dimensional coefficient data row. Therefore, coefficient readout addresses for scan patterns for the respective blocks are supplied from the pattern readout control unit 11 to the scan processing unit 49. The respective coefficient readout addresses are supplied to the respective coefficient memories 30, 31, 32, 33, 34, and 35 as readout addresses. With such a configuration of the scan processing unit 49, the respective coefficient data in units of a block stored in the coefficient memories are outputted to the one-dimensional coefficient data row conforming to the scan pattern. The scan processing unit 49 rearranges the respective coefficient data with such processing and generates the one-dimensional coefficient data row conforming to the scan pattern from the coefficient data arranged in predetermined addresses on the coefficient memories for a two-dimensional block.

The coefficient data row outputted from the scan processing unit 49 is supplied to the variable length encoding unit 41. The variable length encoding unit 41 applies run-level encoding as variable length encoding to the coefficient data in the order conforming to the scan pattern and outputs the coefficient data as encoded data.

In order to read out the one-dimensional coefficient data row conforming to the scan pattern from the coefficient memories of the scan processing unit 49, in the second embodiment, processing for supplying scan pattern data by the pattern memory 17, the control unit 19, the table-address generating unit 18, and the pattern storing unit 10 same as that in the first embodiment is executed.

Type information indicating a type of encoded data such as encoding type information in encoding, picture type information, picture scanning type information, and block division size information is notified to the control unit 19 and the pattern readout control unit 11. In response to the notified type information, first, the control unit 19 reads out a collection of scan pattern data for the type information from the pattern memory 17 and performs writing control to store the read-out scan pattern data in the pattern storing unit 10. In this way, the control unit 19 functions as a pattern writing unit that writes the scan pattern data in the pattern storing unit 10.

The scan pattern data stored in the pattern storing unit 10 are patterns same as the patterns shown in FIGS. 3 to 6. In this way, the control unit 19 sequentially extracting the scan pattern data from the pattern memory 17, outputs a writing control signal to the pattern storing unit 10, and stores the extracted scan pattern data in the respective tables of the pattern storing unit 10 while controlling the table-address generating unit 18 to generate a predetermined storage address. Further, the control unit 19 controls the pattern readout control unit 11 such that the scan pattern data is outputted from the pattern storing unit 10 according to a predetermined procedure.

The pattern readout control unit 11 selects, according to the notified type information, a scan pattern data indicating a scan pattern for encoded data to be generated and performs readout control such that the selected scan pattern data is supplied to the scan processing unit 49. In order to execute such processing, as in the first embodiment, the pattern readout control unit 11 includes the selector 13 and the readout control unit 12.

When the readout control unit 12 is instructed by a control signal from the control unit 19 to execute readout processing for scan pattern data, the readout control unit 12 controls, according to the type information, the selector 13 to select the scan pattern data stored in the respective tables of the pattern storing unit 10. The scan pattern data selected by the selector 13 are respectively supplied to the coefficient memories 30, 31, 32, 33, 34, and 35 as coefficient readout addresses.

A readout instruction signal is notified to the control unit 19 from the variable length encoding unit 41. In starting run-level encoding, the variable length encoding unit 41 outputs the readout instruction signal to the control unit 19 and instructs the control unit 19 to read out coefficient data from the coefficient memories. According to the readout instruction signal, the control unit 19 controls the pattern readout control unit 11 to select scan pattern data for a predetermined type. Consequently, coefficient readout addresses for a scan pattern are sequentially supplied to the respective coefficient memories. As a result, the coefficient data stored in the coefficient memories are outputted from the coefficient memories as readout data according to order of the scan pattern.

The encoding circuit according to this embodiment has the configuration explained above. With such a configuration, it is possible to perform, with a single circuit, encoding according to scan patterns in various image encoding systems.

For example, when encoded data of the JPEG system or the MPEG-1 system is generated, it is sufficient to store scan pattern data of the zigzag scan pattern in the pattern storing unit 10 and set the selector 13 to supply the scan pattern data to the coefficient memories 30, 31, 32, 33, 34, and 35.

When encoded data of the MPEG-2 system is generated, the control unit 19 stores scan pattern data of the zigzag scan pattern and the alternate-vertical scan pattern in the pattern storing unit 10. Further, the readout control unit 12 judges, according to the type information, whether a scan pattern is the zigzag scan pattern or the alternate-vertical scan pattern for each of pictures and controls selection of any one of the scan pattern data by the selector 13. The selected scan pattern data is supplied from the selector 13 to the coefficient memories 30, 31, 32, 33, 34, and 35.

When encoded data of the H.264 system is generated, the control unit 19 stores, in the pattern storing unit 10, scan pattern data for the zigzag scan pattern for the block of vertical and horizontal 4×4 pixels, the alternate-vertical scan pattern for the block of vertical and horizontal 4×4 pixels, the zigzag scan pattern for the block of vertical and horizontal 8×8 pixels, and the alternate-vertical scan pattern for the block of vertical and horizontal 8×8 pixels. Further, the readout control unit 12 determines block division size information and controls selection of any one of the scan pattern data by the selector 13 according to the determined block division size information. The selected scan pattern data is supplied from the selector 13 to the coefficient memories 30, 31, 32, 33, 34, and 35.

In order to operate for a scan pattern with the block of vertical and horizontal 4×4 pixels, the pattern storing unit 10 may store scan pattern data for the zigzag scan pattern for the block of the vertical and horizontal 8×8 pixels obtained by combining four blocks of vertical and horizontal 4×4 pixels shown in FIG. 6 and the alternate-vertical scan pattern for the block of vertical and horizontal 8×8 pixels obtained by combining four blocks of vertical and horizontal 4×4 pixels. Further, in order to operate for a scan pattern with the block of vertical and horizontal 8×8 pixels, the pattern storing unit 10 may store scan pattern data for the zigzag scan pattern for the block of vertical and horizontal 8×8 pixels and the alternate-vertical scan pattern for the block of vertical and horizontal 8×8 pixels.

When encoded data of an encoding system independently developed by a specific company or country is supplied, the control unit 19 only has to store scan pattern data specified by the encoding system in the pattern storing unit 10. The pattern readout control unit 11 only has to supply, on the basis of the rules by the encoding system, an appropriate scan pattern to the coefficient memories 30, 31, 32, 33, 34, and 35.

In this way, the encoding circuit according to this embodiment can set scan patterns in the pattern storing unit 10 as appropriate according to the control by the control unit 19 and select the scan pattern stored in the pattern storing unit 10 and supply the scan pattern to the coefficient memory as appropriate according to the control by the readout control unit 12. Therefore, it is possible to adapt the encoding circuit according to this embodiment to such an encoding system independently developed by the specific company or country as well.

As explained above, the encoding circuit according to the second embodiment of the present invention includes the pattern storing unit 10 that stores scan pattern data for scan patterns, the control unit 19 that writes the scan pattern data in the pattern storing unit 10, the pattern readout control unit 11 that reads out the scan pattern data stored in the pattern storing unit 10, the DCT transform unit 45, the quantizing unit 44 and the DC/AC prediction encoding unit 43 that generates coefficient data from image data, and the scan processing unit 49 that rearranges, according to the scan pattern data read out from the pattern storing unit 10 by the pattern readout control unit 11, the generated coefficient data. The control unit 19 writes scan pattern data indicating a scan pattern for encoded data to be generated in the pattern storing unit 10.

Therefore, for example, even if an encoding system employing a new scan pattern is proposed, it is possible to store the new scan pattern in the pattern storing unit 10 without increasing a capacity of the pattern storing unit 10. As a result, it is possible to provide an encoding circuit having universality that can be adapted to, with a single circuit, various image encoding systems.

In the above explanation, the present invention is explained by citing the example of the embodiment for generating encoded data with the encoding circuit including the functional blocks shown in FIG. 10. However, for example, the present invention may be an encoding method including a pattern writing step of writing scan pattern data indicating a scan pattern for encoded data to be generated in the pattern storing unit 10, a pattern readout step of reading out the scan pattern data stored in the pattern storing unit 10, a coefficient generating step of generating coefficient data from image data, and a scan processing step of rearranging the generated coefficient data according to the scan pattern data read out from the pattern storing unit 10. Specifically, if a program for executing the respective processing steps of such an encoding method is stored in a memory or the like, for example, a CPU such as a microprocessor may sequentially read the program stored in the memory and execute processing according to the read program.

In the above explanation, in the case of the first embodiment, the encoding-information extracting unit 22 notifies the control unit 19 of the encoding type information, the picture type information, and the picture scanning type information, which are information that appears at a relatively low frequency at a picture level in the extracted information, and notifies the pattern readout control unit 11 of the intra/inter information, the macro block type information, and the block division size information, which are information that appears at a high frequency. However, the present invention is not limited to this. The encoding-information extracting unit 22 may notify the control unit 19 of the encoding type information, the picture type information, the picture scanning type information, the intra/inter information, the macro block type information, and the block division size information included in the extracted information. The control unit 19 may control the pattern readout control unit 11 on the basis of these kinds of information.

The present invention has been explained on the basis of the first and second embodiments. However, it goes without saying that the present invention is not limited to the first and second embodiments. Cases explained below are also included in the present invention.

A part or all of the components configuring the decoding circuit and the encoding circuit may be included in one system LSI (Large Scale Integration). The system LSI is an ultra multifunction LSI manufactured by integrating plural components on one chip.

Respective units of the components configuring the circuits may be individually formed as one chip or may be formed as one chip to include a part or all of the units.

The circuits are referred to as system LSI above. However, according to a difference in an integration degree, the circuits may be referred to as IC (Integrated Circuit), LSI, super LSI, or ultra LSI. A method of circuit integration is not limited to the LSI and may be realized by a dedicated circuit or a general-purpose processor. After the LSI is manufactured, a programmable FPGA (Field Programmable Gate Array) or a reconfigurable processor that can reconfigure connection and setting of circuit cells in the LSI may be used.

Moreover, if a technique for circuit integration replacing the LSI according to the development of the semiconductor technique or other techniques deriving from the semiconductor technique, naturally, integration of functional blocks may be performed by using the technique. Adaptation of the biotechnology or the like could be possible.

The present invention may be the decoding method and the encoding method. The present invention may be a computer program that realizes the decoding method and the encoding method with a computer or may be a digital signal including the computer program.

The present invention may be the computer program or the digital signal recorded in computer readable recording media such as a flexible disk, a hard disk, a CD-ROM, an MO, a DVD, a DVD-ROM, a DVD-RAM, a BD (Blu-ray Disc), and a semiconductor memory. The present invention may be the digital signal recorded in these recording media.

The present invention may be the computer program or the digital signal transmitted through networks represented by an electric communication line, a radio communication line, a wire communication line, and the Internet, a data broadcast, or the like.

The present invention may be a computer system including a microprocessor and a memory, the memory may store the computer program, and the microprocessor may operate according to the computer program.

The program or the digital signal may be carried out by independent another computer system by recording the program or the digital signal in the recording media and transferring the same or by transferring the program or the digital signal through the networks and the like.

The embodiments and the modifications may be combined with each other.

Third Embodiment

Figure 11:
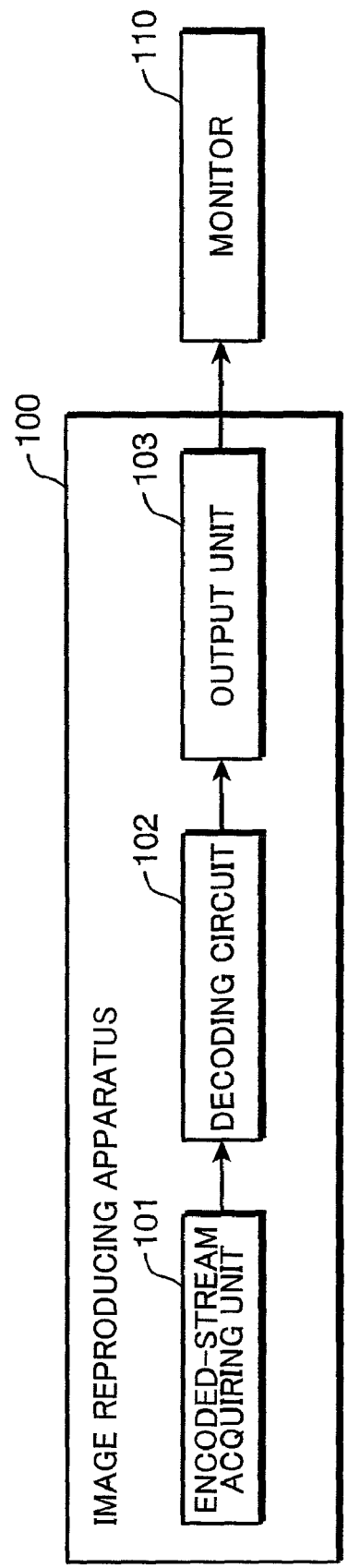
FIG. 11 is a block diagram showing a configuration of an image reproducing apparatus according to a third embodiment of the present invention.
Figure 12:
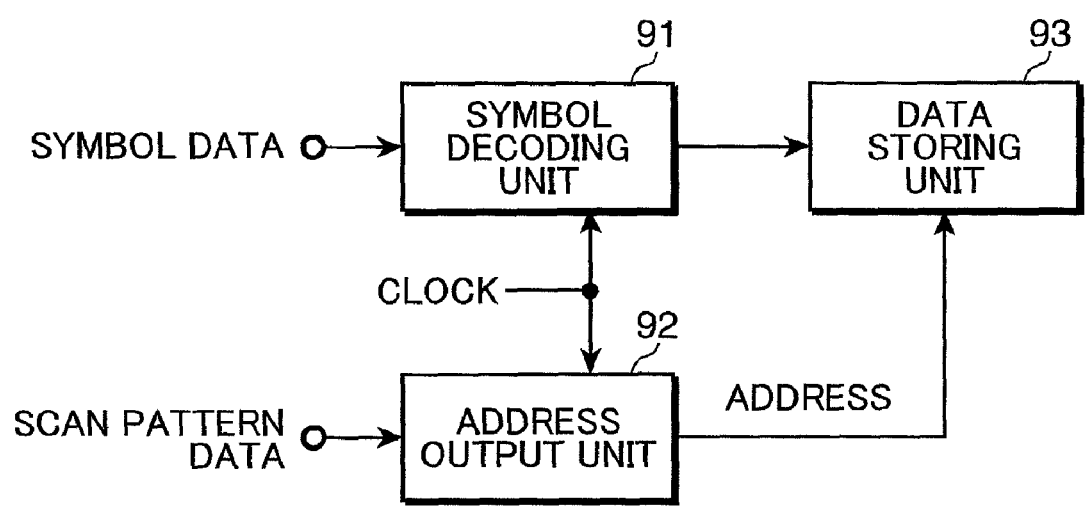
FIG. 12 is a block diagram showing a configuration of a decoding circuit in the past.

FIG. 11 is a block diagram showing a configuration of an image reproducing apparatus according to a third embodiment of the present invention. Examples of the image reproducing apparatus include a personal computer, a set-top box, an optical disk recorder, an optical disk player, a television, a portable information terminal apparatus, and a cellular phone.

An image reproducing apparatus 100 shown in FIG. 11 includes an encoded-stream acquiring unit 101, a decoding circuit 102, and an output unit 103. The encoded-stream acquiring unit 101 acquires an encoded stream. The encoded-stream acquiring unit 101 acquires the encoded stream via a network, acquires the encoded stream by reading an optical disk such as a DVD or a Blu-ray disk, and acquires the encoded stream from a broadcasting wave via an antenna.

The decoding circuit 102 is the decoding circuit explained in the first embodiment. The decoding circuit 102 extracts encoded data generated by image compression encoding from the encoded stream acquired by the encoded-stream acquiring unit 101 and decodes the extracted encoded data. The output unit 103 outputs image data decoded by the decoding circuit 102 to a monitor 110. The monitor 110 displays the image data outputted by the output unit 103.

The image reproducing apparatus 100 is mounted with the decoding circuit explained in the first embodiment. Therefore, the image reproducing apparatus 100 according to this embodiment can perform, with a single circuit, decoding in association with various encoding systems.

Inventions having the following configurations are mainly included in the specific embodiments explained above.

A decoding circuit according to an aspect of the present invention is a decoding circuit that decodes encoded data generated by image compression encoding for transforming image data into plural coefficient data in units of a block of a predetermined number of pixels and rearranging the transformed plural coefficient data according to a scan pattern indicating order of data, the decoding circuit including: a pattern storing unit that stores scan pattern data for the scan pattern; a pattern writing unit that writes the scan pattern data for the encoded data supplied thereto in the pattern storing unit; a pattern readout unit that reads out the scan pattern data stored in the pattern storing unit; a coefficient restoring unit that restores the coefficient data from the supplied encoded data; and an inverse scan processing unit that rearranges, according to the scan pattern data read out from the pattern storing unit by the pattern readout unit, the coefficient data restored by the coefficient restoring unit.

With this configuration, scan pattern data for a scan pattern is stored in the pattern storing unit and the scan pattern data for encoded data supplied thereto is written in the pattern storing unit by the pattern writing unit. The scan pattern data stored in the pattern storing unit is read out by the pattern readout unit and coefficient data is restored from the supplied encoded data by the coefficient restoring unit. Thereafter, the coefficient data restored by the coefficient restoring unit are rearranged by the inverse scan processing unit according to the scan pattern data read out from the pattern storing unit by the pattern readout unit.

Therefore, since the scan pattern data for the supplied encoded data is written in the pattern storing unit, it is possible to perform, with a single circuit, decoding in association with various image encoding systems and it is possible to provide a decoding circuit that has universality. Even if an encoding system employing a new scan pattern is proposed, it is possible to store a scan pattern for the new scan pattern in the pattern storing unit without increasing a capacity of the pattern storing unit, it is possible to quickly cope with an unknown standard to be proposed in future, and redesign of an LSI and the like is unnecessary.

It is preferable that, in the decoding circuit, the pattern writing unit writes the scan pattern data for an encoding system of the image compression encoding, with which the supplied encoded data is generated, in the pattern storing unit.

With this configuration, the scan pattern data for the encoding system of the image compression encoding, with which the supplied encoded data is generated, is written in the pattern storing unit by the pattern writing unit. Therefore, it is possible to rearrange, according to the scan pattern data for the encoding system of the image compression encoding, with which the supplied encoded data is generated, the coefficient data restored by the coefficient restoring unit.

It is preferable that, in the decoding circuit, the pattern writing unit further writes the scan pattern data for a type specified by an encoding system for the supplied encoded data in the pattern storing unit.

With this configuration, the scan pattern data for the type specified by the encoding system for the supplied encoded data is further written in the pattern storing unit by the pattern writing unit. Therefore, it is possible to rearrange, according to the scan pattern data for the type specified by the encoding system for the supplied encoded data, the coefficient data restored by the coefficient restoring unit.

It is preferable that, in the decoding circuit, the pattern writing unit writes the scan pattern data in the pattern storing unit in the unit of a processing based on the type.

With this configuration, the scan pattern data is written in the pattern storing unit in the unit of a processing based on the type specified by the encoding system for the supplied encoded data. Therefore, it is possible to rearrange, in the unit of a processing based on the type specified by the encoding system for the supplied encoded data, the coefficient data restored by the coefficient restoring unit.

It is preferable that, in the decoding circuit, the pattern storing unit stores plural scan pattern data and the pattern readout unit selects scan pattern data for the supplied encoded data out of the plural scan pattern data and supplies the selected scan pattern data to the inverse scan processing unit.

With this configuration, the plural scan pattern data are stored in the pattern storing unit, the scan pattern data for the supplied coefficient data is selected out of the plural scan pattern data, and the selected scan pattern data is supplied to the inverse scan processing unit by the pattern readout unit.

Therefore, it is possible to rearrange, according to the scan pattern data selected according to the supplied encoded data out of the plural scan pattern data, the coefficient data restored by the coefficient restoring unit.

It is preferable that, in the decoding circuit, the pattern readout unit selects, in the block units of the supplied encoded data, the scan pattern data for the encoded data out of the plural scan pattern data.

With this configuration, the scan pattern data for the encoded data is selected out of the plural scan pattern data in the block units of the supplied encoded data by the pattern readout unit. Therefore, it is possible to rearrange, according to the scan pattern data selected in the block units of the supplied encoded data, the coefficient data restored by the coefficient restoring unit.

It is preferable that, in the decoding circuit, the pattern readout unit selects, according to the structure of the block of the supplied encoded data, the scan pattern data for the encoded data out of the plural scan pattern data.

With this configuration, the scan pattern data for the encoded data is selected out of the plural scan pattern data by the pattern readout unit according to the structure of the block of the supplied encoded data. Therefore, it is possible to rearrange, according to the scan pattern data selected according to the structure of the block of the supplied encoded data, the coefficient data restored by the coefficient restoring unit.

It is preferable that, in the decoding circuit, the pattern storing unit stores scan pattern data associated with a block formed by vertical and horizontal 8×8 coefficients, forms a block of vertical and horizontal 8×8 coefficients by combining plural blocks smaller than the block formed by vertical and horizontal 8×8 coefficients, and stores scan pattern data associated with the formed block.

With this configuration, the scan pattern data associated with the block formed by vertical and horizontal 8×8 coefficients is stored in the pattern storing unit. Further, the block of vertical and horizontal 8×8 coefficients is formed by combining the plural blocks smaller than the block formed by vertical and horizontal 8×8 coefficients and the scan pattern data associated with the formed block is stored in the pattern storing unit.

Therefore, when image data is transformed into coefficient data in the block formed by vertical and horizontal 8×8 coefficients, it is possible to rearrange, according to scan pattern data for the block, the coefficient data restored by the coefficient restoring unit. When image data is transformed into plural coefficient data in units of a block smaller than the block formed by vertical and horizontal 8×8 coefficients, a block of vertical and horizontal 8×8 coefficients is formed by combining a plurality of the blocks. It is possible to rearrange, according to scan pattern data for the formed block, the coefficient data restored by the coefficient restoring unit.

It is preferable that, in the decoding circuit, the pattern readout unit selects, according to whether the supplied encoded data is intra-picture encoded or inter-picture encoded, the scan pattern data for the encoded data out of the plural scan pattern data.

With this configuration, according to whether the supplied encoded data is intra-picture encoded or inter-picture encoded, the scan pattern data for the encoded data is selected out of the plural scan pattern data by the pattern readout unit. Therefore, it is possible to rearrange, according to the scan pattern data selected according to whether the supplied encoded data is intra-picture encoded or inter-picture encoded, the coefficient data restored by the coefficient restoring unit.

It is preferable that, in the decoding circuit, the pattern readout unit selects the scan pattern data for the encoded data out of the plural scan pattern data according to whether the supplied encoded data is a field structure or a frame structure.

With this configuration, the scan pattern data for the encoded data is selected out of the plural scan pattern data by the pattern readout unit according to whether the supplied encoded data is the field structure or the frame structure. Therefore, it is possible to rearrange, according to the scan pattern data selected according to whether the supplied encoded data is the field structure or the frame structure, the coefficient data restored by the coefficient restoring unit.

It is preferable that, in the decoding circuit, the pattern readout unit selects the scan pattern data for the encoded data out of the plural scan pattern data according to whether the block of the supplied encoded data is further divided into plural sub-blocks.

With this configuration, the scan pattern data for the encoded data is selected out of the plural scan pattern data by the pattern readout unit according to whether the block of the supplied encoded data is further divided into plural sub-blocks. Therefore, it is possible to rearrange, according to the scan pattern data selected according to whether the block of the supplied encoded data is further divided into plural sub-blocks, the coefficient data restored by the coefficient restoring unit.

It is preferable that, in the decoding circuit, the pattern readout unit selects the scan pattern data for the encoded data out of the plural scan pattern data according to contents of prediction processing applied to the block of the supplied encoded data.

With this configuration, the scan pattern data for the encoded data is selected out of the plural scan pattern data by the pattern readout unit according to the contents of the prediction processing applied to the block of the supplied encoded data. Therefore, it is possible to rearrange, according to the scan pattern data selected according to the contents of the prediction processing applied to the block of the supplied encoded data, the coefficient data restored by the coefficient restoring unit.

It is preferable that, in the decoding circuit, the contents of the prediction processing are presence or absence of prediction and a direction of prediction in DC/AC prediction.

With this configuration, it is possible to select the scan pattern data for the encoded data out of the plural scan pattern data according to the presence or absence of prediction and the direction of prediction in the DC/AC prediction applied to the block of the supplied encoded data.

A decoding method according to another aspect of the present invention is a decoding method of decoding encoded data generated by image compression encoding for transforming image data into plural coefficient data in units of a block of a predetermined number of pixels and rearranging the transformed plural coefficient data according to a scan pattern indicating order of data, the decoding method including: a pattern writing step of writing the scan pattern data for the encoded data supplied in a pattern storing unit that stores scan pattern data for the scan pattern; a pattern readout step of reading out the scan pattern data stored in the pattern storing unit; a coefficient restoring step of restoring the coefficient data from the supplied encoded data; and an inverse scan processing step of rearranging, according to the scan pattern data read out from the pattern storing unit in the pattern readout step, the coefficient data restored in the coefficient restoring step.

With this configuration, scan pattern data for a scan pattern is stored in the pattern storing unit and the scan pattern data for encoded data supplied is written in the pattern storing unit in the pattern writing step. The scan pattern data stored in the pattern storing unit is read out in the pattern readout step and coefficient data is restored from the supplied encoded data in the coefficient restoring step. Thereafter, the coefficient data restored in the coefficient restoring step are rearranged in the inverse scan processing step according to the scan pattern data read out from the pattern storing unit in the pattern readout step.

Therefore, since the scan pattern data for the supplied encoded data is written in the pattern storing unit, it is possible to perform, with a single circuit, decoding for various image encoding systems and it is possible to provide a decoding method that has universality. Even if an encoding system employing a new scan pattern is proposed, it is possible to store a scan pattern for the new scan pattern in the pattern storing unit without increasing a capacity of the pattern storing unit, it is possible to quickly cope with an unknown standard to be proposed in future, and redesign of an LSI and the like is unnecessary.

An encoding circuit according to still another aspect of the present invention is an encoding circuit that generates encoded data with image compression encoding for transforming image data into plural coefficient data in units of a block of a predetermined number of pixels and rearranging the transformed plural coefficient data according to a scan pattern indicating order of data, the encoding circuit including: a pattern storing unit that stores scan pattern data for the scan pattern; a pattern writing unit that writes the scan pattern data for the encoded data to be generated in the pattern storing unit; a pattern readout unit that reads out the scan pattern data stored in the pattern storing unit; a coefficient generating unit that generates the coefficient data from the image data supplied thereto; and a scan processing unit that rearranges, according to the scan pattern data read out from the pattern storing unit by the pattern readout unit, the coefficient data generated by the coefficient generating unit.

With this configuration, scan pattern data for a scan pattern is stored in the pattern storing unit and the scan pattern data for encoded data to be generated is written in the pattern storing unit by the pattern writing unit. The scan pattern data stored in the pattern storing unit is read out by the pattern readout unit and coefficient data is generated from the supplied image data by the coefficient generating unit. Thereafter, the coefficient data generated by the coefficient generating unit are rearranged by the scan processing unit according to the scan pattern data read out from the pattern storing unit by the pattern readout unit.

Therefore, since the scan pattern data for the encoded data to be generated is written in the pattern storing unit, it is possible to perform, with a single circuit, encoding for various image encoding systems and it is possible to provide an encoding circuit that has universality. Even if an encoding system employing a new scan pattern is proposed, it is possible to store the new scan pattern in the pattern storing unit without increasing a capacity of the pattern storing unit, it is possible to quickly cope with an unknown standard to be proposed in future, and redesign of an LSI and the like is unnecessary.

It is preferable that, in the encoding circuit, the pattern writing unit writes the scan pattern data for an encoding system of the image compression encoding for generating the encoded data in the pattern storing unit.

With this configuration, the scan pattern data for the encoding system of the image compression encoding for generating the encoded data is written in the pattern storing unit by the pattern writing unit. Therefore, it is possible to rearrange, according to the scan pattern data for the encoding system of the image compression encoding for generating the encoded data, the coefficient data generated by the coefficient generating unit.

It is preferable that, in the encoding circuit, the pattern writing unit further writes the scan pattern data for a type specified by an encoding system for the encoded data to be generated in the pattern storing unit.

With this configuration, the scan pattern data for the type specified by the encoding system for the encoded data to be generated is further written in the pattern storing unit by the pattern writing unit. Therefore, it is possible to rearrange, according to the scan pattern data for the type specified by the encoding system for the encoded data to be generated, the coefficient data generated by the coefficient generating unit.

It is preferable that, in the encoding circuit, the pattern storing unit stores plural scan pattern data and the pattern readout unit selects scan pattern data for the encoded data to be generated out of the plural scan pattern data and supplies the selected scan pattern data to the scan processing unit.

With this configuration, the plural scan pattern data are stored in the pattern storing unit and the scan pattern data for the coefficient data to be generated is selected out of the plural scan pattern data and the selected scan pattern data is supplied to the scan processing unit by the pattern readout unit.

Therefore, it is possible to rearrange, according to the scan pattern data selected according to the encoded data to be generated out of the plural scan pattern data, the coefficient data generated by the coefficient generating unit.

It is preferable that, in the encoding circuit, the pattern readout unit selects, in the block units of the encoded data to be generated, the scan pattern data for the encoded data out of the plural scan pattern data.

With this configuration, the scan pattern data for the encoded data is selected, by the pattern readout unit, out of the plural scan pattern data in the block units of the encoded data to be generated. Therefore, it is possible to rearrange, according to the scan pattern data selected in the block units of the encoded data to be generated, the coefficient data generated by the coefficient generating unit.

It is preferable that, in the encoding circuit, the pattern readout unit selects, according to the structure of the block of the encoded data to be generated, the scan pattern data for the encoded data out of the plural scan pattern data.

With this configuration, the scan pattern data for the encoded data is selected out of the plural scan pattern data by the pattern readout unit according to the structure of the block of the encoded data to be generated. Therefore, it is possible to rearrange, according to the scan pattern data selected according to the structure of the block of the encoded data to be generated, the coefficient data generated by the coefficient generating unit.

It is preferable that, in the encoding circuit, the pattern storing unit stores scan pattern data associated with a block formed by vertical and horizontal 8×8 pixels, forms a block of vertical and horizontal 8×8 pixels by combining plural blocks smaller than the block formed by vertical and horizontal 8×8 pixels, and stores scan pattern data associated with the formed block.

With this configuration, the scan pattern data associated with the block formed by vertical and horizontal 8×8 pixels is stored in the pattern storing unit. Further, the block of vertical and horizontal 8×8 pixels is formed by combining the plural blocks smaller than the block formed by vertical and horizontal 8×8 pixels and the scan pattern data associated with the formed block is stored in the pattern storing unit.

Therefore, when image data is transformed into plural coefficient data in units of a block formed by vertical and horizontal 8×8 pixels, it is possible to rearrange, according to scan pattern data for the block, the coefficient data generated by the coefficient generating unit. When image data is transformed into plural coefficient data in units of a block smaller than the block formed by vertical and horizontal 8×8 pixels, a block of vertical and horizontal 8×8 pixels is formed by combining a plurality of the blocks. It is possible to rearrange, according to scan pattern data for the formed block, the coefficient data generated by the coefficient generating unit.

It is preferable that, in the encoding circuit, the pattern readout unit selects, according to whether the encoded data to be generated is intra-picture encoded or inter-picture encoded, the scan pattern data for the encoded data out of the plural scan pattern data.

With this configuration, according to whether the encoded data to be generated is intra-picture encoded or inter-picture encoded, the scan pattern data for the encoded data is selected out of the plural scan pattern data by the pattern readout unit. Therefore, it is possible to rearrange, according to the scan pattern data selected according to whether the encoded data to be generated is intra-picture encoded or inter-picture encoded, the coefficient data generated by the coefficient generating unit.

It is preferable that, in the encoding circuit, the pattern readout unit selects the scan pattern data for the encoded data out of the plural scan pattern data according to whether the encoded data to be generated is a field structure or a frame structure.

With this configuration, the scan pattern data for the encoded data is selected out of the plural scan pattern data by the pattern readout unit according to whether the encoded data to be generated is the field structure or the frame structure. Therefore, it is possible to rearrange, according to the scan pattern data selected according to whether the encoded data to be generated is the field structure or the frame structure, the coefficient data generated by the coefficient generating unit.

It is preferable that, in the encoding circuit, the pattern readout unit selects the scan pattern data for the encoded data out of the plural scan pattern data according to whether the block of the encoded data to be generated is further divided into plural sub-blocks.

With this configuration, the scan pattern data for the encoded data is selected out of the plural scan pattern data by the pattern readout unit according to whether the block of the encoded data to be generated is further divided into plural sub-blocks. Therefore, it is possible to rearrange, according to the scan pattern data selected according to whether the block of the encoded data to be generated is further divided into plural sub-blocks, the coefficient data generated by the coefficient generating unit.

It is preferable that, in the encoding circuit, the pattern readout unit selects the scan pattern data for the encoded data out of the plural scan pattern data according to contents of prediction processing applied to the block of the encoded data to be generated.

With this configuration, the scan pattern data for the encoded data is selected out of the plural scan pattern data by the pattern readout unit according to the contents of the prediction processing applied to the block of the encoded data to be generated. Therefore, it is possible to rearrange, according to the scan pattern data selected according to the contents of the prediction processing applied to the block of the encoded data to be generated, the coefficient data generated by the coefficient generating unit.

It is preferable that, in the encoding circuit, the contents of the prediction processing are presence or absence of prediction and a direction of prediction in DC/AC prediction.

With this configuration, it is possible to select the scan pattern data for the encoded data out of the plural scan pattern data according to the presence or absence of prediction and the direction of prediction in the DC/AC prediction applied to the block of the encoded data to be generated.

An encoding method according to still another aspect of the present invention is an encoding method of generating encoded data with image compression encoding for transforming image data into plural coefficient data in units of a block of a predetermined number of pixels and rearranging the transformed plural coefficient data according to a scan pattern indicating order of data, the encoding method including: a pattern writing step of writing the scan pattern data for the coefficient data to be generated in a pattern storing unit that stores scan pattern data for the scan pattern; a pattern readout step of reading out the scan pattern data stored in the pattern storing unit; a coefficient generating step of generating the coefficient data from the image data supplied; and a scan processing step of rearranging, according to the scan pattern data read out from the pattern storing unit in the pattern readout step, the coefficient data generated in the coefficient generating step.

With this configuration, scan pattern data for a scan pattern is stored in the pattern storing unit and the scan pattern data for encoded data to be generated is written in the pattern storing unit in the pattern writing step. The scan pattern data stored in the pattern storing unit is read out in the pattern readout step and coefficient data is generated from the supplied image data in the coefficient generating step. Thereafter, the coefficient data generated in the coefficient generating step are rearranged in the scan processing step according to the scan pattern data read out from the pattern storing unit in the pattern readout step.

Therefore, since the scan pattern data for the encoded data to be generated is written in the pattern storing unit, it is possible to perform, with a single circuit, encoding for various image encoding systems and it is possible to provide an encoding method that has universality. Even if an encoding system employing a new scan pattern is proposed, it is possible to store the new scan pattern in the pattern storing unit without increasing a capacity of the pattern storing unit, it is possible to quickly cope with an unknown standard to be proposed in future, and redesign of an LSI and the like is unnecessary.

An image reproducing apparatus according to still another aspect of the present invention includes: an encoded-data acquiring unit that acquires encoded data generated by image compression encoding for transforming image data into plural coefficient data in units of a block of a predetermined number of pixels and rearranging the transformed plural coefficient data according to a scan pattern indicating order of data; the aforementioned decoding circuit that decodes the encoded data acquired by the encoded-data acquiring unit; and an output unit that outputs the image data decoded by the decoding circuit.

With this configuration, encoded data generated by the image compression encoding for transforming image data into plural coefficient data in units of a block of a predetermined number of pixels and rearranging the transformed plural coefficient data into a scan pattern indicating order of data is acquired by the encoded-data acquiring unit. The encoded data acquired by the encoded-data acquiring unit is decoded by the aforementioned decoding circuit. The image data decoded by the decoding circuit is outputted by the output unit.

Therefore, it is possible to apply the decoding circuit to image reproducing apparatuses such as a personal computer, a set-top box, a portable information terminal apparatus, and a cellular phone.

The decoding circuit and the decoding method according to the present invention can be used for, for example, an integrated circuit such as an LSI having a function of applying decoding to encoded data, which is data encoded on the basis of an encoding system for an image, an information apparatus such as a personal computer, a set-top box, a portable information terminal apparatus, or a cellular phone including such an integrated circuit, and other apparatuses.

The encoding circuit and the encoding method according to the present invention can be used for, for example, an integrated circuit such as an LSI having a function of generating encoded data on the basis of an encoding system for an image, an information apparatus such as a personal computer, a set-top box, a portable information terminal apparatus, or a cellular phone including such an integrated circuit, and other apparatuses.

The invention claimed is:

1. A decoding circuit that decodes encoded data generated by image compression encoding for transforming image data into plural coefficient data in units of a block of a predetermined number of pixels and rearranging the transformed plural coefficient data according to a scan pattern indicating order of the coefficient data, the decoding circuit comprising:
a pattern storing unit that stores scan pattern data for a scan pattern;
a control unit that rewrites, according to encoded data, the scan pattern data stored in the pattern storing unit into at least one scan pattern data for an encoding system of the encoded data and generates, according to the encoded data, pattern selection information indicating a selection method for selecting one scan pattern data suitable for the encoded data out of the at least one scan pattern data stored in the pattern storing unit;
a pattern readout unit that selects one scan pattern data suitable for the encoded data out of the at least one scan pattern data stored in the pattern storing unit using the pattern selection information and reads out the selected scan pattern data stored in the pattern storing unit;
a coefficient restoring unit that restores coefficient data from the encoded data; and
an inverse scan processing unit that rearranges, according to the scan pattern data read out by the pattern readout unit, the coefficient data restored by the coefficient restoring unit.

2. The decoding circuit according to claim 1, wherein the control unit writes the scan pattern data for the encoding system of the image compression encoding, with which the encoded data is generated, in the pattern storing unit.

3. The decoding circuit according to claim 2, wherein the control unit further writes the scan pattern data for a type specified by an encoding system for the encoded data in the pattern storing unit.

4. The decoding circuit according to claim 3, wherein the control writes the scan pattern data in the pattern storing unit in the unit of a processing based on the type.

5. The decoding circuit according to claim 1, wherein the pattern storing unit stores plural scan pattern data, and the pattern readout unit determines scan pattern data suitable for the encoded data out of the plural scan pattern data and supplies the determined scan pattern data to the inverse scan processing unit.

6. The decoding circuit according to claim 5, wherein the pattern storing unit stores scan pattern data associated with a block formed by vertical and horizontal 8×8 coefficients, forms a block of vertical and horizontal 8×8 coefficients by combining plural blocks smaller than the block formed by vertical and horizontal 8×8 coefficients, and stores scan pattern data associated with the formed block.

7. The decoding circuit according to claim 5, wherein
the pattern readout unit determines, in the block units of the encoded data, the scan pattern data suitable for the encoded data out of the plural scan pattern data.

8. The decoding circuit according to claim 7, wherein
the pattern readout unit determines the scan pattern data suitable for the encoded data out of the plural scan pattern data according to contents of prediction processing applied to the block of the encoded data.

9. The decoding circuit according to claim 8, wherein
the contents of the prediction processing are presence or absence of prediction and a direction of prediction in DC/AC prediction.

10. The decoding circuit according to claim 7, wherein
the pattern readout unit determines, according to a structure of the block of the encoded data, the scan pattern data suitable for the encoded data out of the plural scan pattern data.

11. The decoding circuit according to claim 10, wherein
the pattern readout unit determines, according to whether the encoded data is intra-picture encoded or inter-picture encoded, the scan pattern data suitable for the encoded data out of the plural scan pattern data.

12. The decoding circuit according to claim 10, wherein
the pattern readout unit determines the scan pattern data suitable for the encoded data out of the plural scan pattern data according to whether the encoded data is a field structure or a frame structure.

13. The decoding circuit according to claim 10, wherein
the pattern readout unit determines the scan pattern data suitable for the encoded data out of the plural scan pattern data according to whether the block of the encoded data is further divided into plural sub-blocks.

14. A decoding method of decoding encoded data generated by image compression encoding for transforming image data into plural coefficient data in units of a block of a predetermined number of pixels and rearranging the transformed plural coefficient data according to a scan pattern indicating order of the coefficient data, the decoding method comprising:
a pattern writing step of rewriting, with respect to a pattern storing unit that stores scan pattern data for a scan pattern, according to encoded data, the scan pattern data stored in the pattern storing unit into at least one scan pattern data for an encoding system of the encoded data;
an information generating step of generating, according to the encoded data, pattern selection information indicating a selection method for selecting one scan pattern data suitable for the encoded data out of the at least one scan pattern data stored in the pattern storing unit;
a pattern readout step of selecting one scan pattern data suitable for the encoded data out of the at least one scan pattern data stored in the pattern unit using the pattern selection information and reading out the selected scan pattern data stored in the pattern storing unit;
a coefficient restoring step of restoring coefficient data from the encoded data; and
an inverse scan processing step of rearranging, according to the scan pattern data read out in the pattern readout step, the coefficient data restored in the coefficient restoring step.

15. An encoding circuit that generates encoded data with image compression encoding for transforming image data into plural coefficient data in units of a block of a predetermined number of pixels and rearranging the transformed plural coefficient data according to a scan pattern indicating order of the coefficient data, the encoding circuit comprising:
a pattern storing unit that stores scan pattern data for thea, pattern;
a control unit that rewrites, according to encoded data, the scan pattern data stored in the pattern storing unit into at least one scan pattern data for an encoding system of the encoded data and generates, according to the encoded data, pattern selection information indicating a selection method for selecting one scan pattern data suitable for the encoded data out of the at least the scan pattern data stored in the pattern storing unit;
a pattern readout unit that selects one scan pattern data suitable for the encoded data out of the at least the scan pattern data stored in the pattern storing unit using the pattern selection information and reads out the selected scan pattern data stored in the pattern storing unit;
a coefficient generating unit that generates coefficient data from the image data; and
a scan processing unit that rearranges, according to the scan pattern data read out by the pattern readout unit, the coefficient data generated by the coefficient generating unit.

16. An encoding method of generating encoded data with image compression encoding for transforming image data into plural coefficient data in units of a block of a predetermined number of pixels and rearranging the transformed plural coefficient data according to a scan pattern indicating order of the coefficient data, the encoding method comprising:
a pattern writing step of rewriting, with respect to a pattern storing unit that stores scan pattern data for a scan pattern, according to encoded data, the scan pattern data stored in the pattern storing unit into at least one scan pattern data for the encoding system of the encoded data;
an information generating step of generating, according to the encoded data, pattern selection information indicating a selection method for selecting one scan pattern data suitable for the encoded data out of the at least the scan pattern data stored in the pattern unit;
a pattern readout step of selecting one scan pattern data suitable for the encoded data out of the at least one scan pattern data stored in the pattern storing unit using the pattern selection information and reading out the selected scan pattern data stored in the pattern storing unit;
a coefficient generating step of generating coefficient data from the image data; and
a scan processing step of rearranging, according to the scan pattern data read out in the pattern readout step, the coefficient data generated in the coefficient generating step.

* * * * *